(12) United States Patent
Perg et al.

(10) Patent No.: US 8,392,302 B2
(45) Date of Patent: Mar. 5, 2013

(54) COMPUTER-AIDED PROCESS FOR INFLATION-IMMUNIZED DERIVATIVES

(75) Inventors: Wayne F. Perg, Sierra Vista, AZ (US);
Anthony F. Herbst, El Paso, TX (US);
T. Brian Gidley, Tower Lakes, IL (US)

(73) Assignee: Task Management, Inc., Riverside, IL (US)

( * ) Notice: Subject to any disclaimer, the term of this patent is extended or adjusted under 35 U.S.C. 154(b) by 0 days.

(21) Appl. No.: 12/723,177

(22) Filed: Mar. 12, 2010

(65) Prior Publication Data
US 2011/0225078 A1   Sep. 15, 2011

Related U.S. Application Data

(63) Continuation of application No. 11/368,728, filed on Mar. 6, 2006, now Pat. No. 7,680,713, which is a continuation-in-part of application No. 10/957,399, filed on Oct. 1, 2004, now Pat. No. 7,747,489, and a continuation-in-part of application No. 11/074,121, (Continued)

(51) Int. Cl.
*G06Q 40/00* (2012.01)
(52) U.S. Cl. ......... 705/35; 705/36 R; 705/36 T; 705/38; 705/37; 705/1.1
(58) Field of Classification Search ............ 705/1.1, 705/35, 36 R, 36 T, 38, 37, 313, 31, 39; 235/380, 235/379, 92; 364/710, 569, 705
See application file for complete search history.

(56) References Cited

U.S. PATENT DOCUMENTS

| 4,283,769 A | 8/1981 | Asada |
| 4,674,044 A | 6/1987 | Kalmus et al. |
| 4,742,457 A * | 5/1988 | Leon et al. ............ 705/35 |
| 4,823,265 A | 4/1989 | Nelson |
| 4,933,842 A | 6/1990 | Durbin et al. |

(Continued)

FOREIGN PATENT DOCUMENTS
WO   99/46658 A2   9/1999

OTHER PUBLICATIONS

"Has John Liegey got a country for you!" (CEO of Weston Holding Group, a US brokerage and investment firm specializing in Mexico); Conger, Lucy Institutional Investor, v30, n9, p. 39(5); Sep. 1996.*

(Continued)

*Primary Examiner* — John H Holly
(74) *Attorney, Agent, or Firm* — Patents and Licensing LLC; Daniel W Juffernbruch

(57) ABSTRACT

A computer system converts real-valued, inflation-immunized derivative terms to nominal-valued, non-inflation-immunized data. A stipulated index is considered in this conversion as a function of time. At an input device, real-valued, inflation-immunized derivative terms and a stipulated index as a function of time are received. Also received at the input device are input values corresponding to the real-valued, inflation-immunized derivative terms, wherein the input values include at least a quantity value and data from the stipulated index at a corresponding time. The computer processes these real-oriented, inflation-immunized derivative terms with the stipulated index and thereby produces nominal-valued, non-inflation-immunized data corresponding to the real-valued, inflation-immunized derivative terms. Nominal-valued, non-inflation-immunized data is presented by the computer at an output device for the computer. The inflation-immunized derivatives can be of various forms. The stipulated index cam comprise an infill index. The infill index can indicate an agreed upon approach to interpolate data for days missing from the stipulated index.

13 Claims, 15 Drawing Sheets

Figure 1:
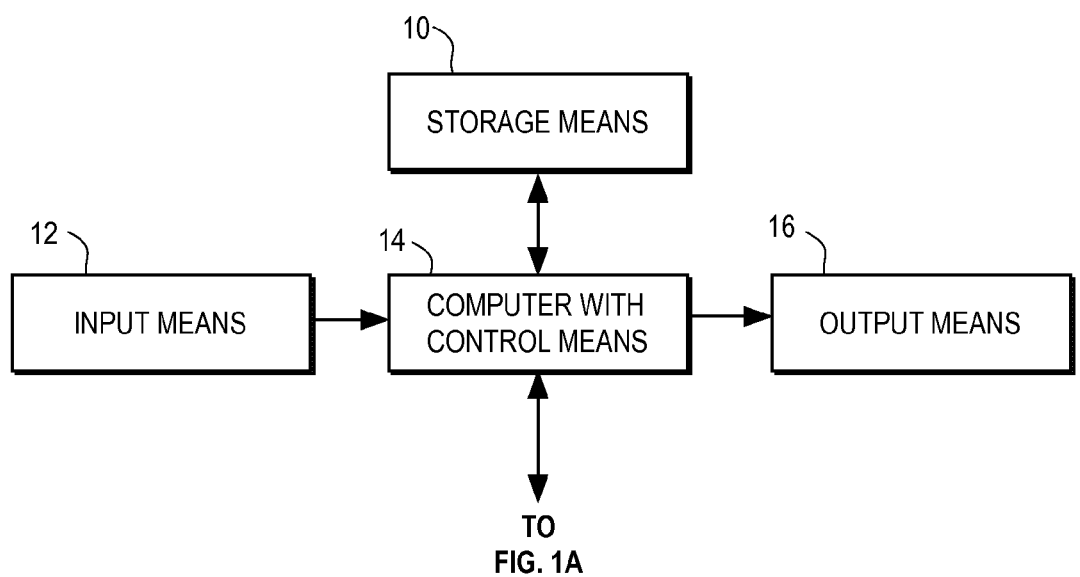

Related U.S. Application Data filed on Mar. 7, 2005, now Pat. No. 7,752,105, said application No. 12/723,177 is a continuation of application No. 10/885,442, filed on Jul. 6, 2004, now Pat. No. 7,702,550, which is a continuation-in-part of application No. 09/283,102, filed on Mar. 31, 1999, now Pat. No. 6,760,710.

(60) Provisional application No. 60/775,285, filed on Feb. 21, 2006.

(56) References Cited

U.S. PATENT DOCUMENTS

| | | |
|---|---|---|
| 5,126,936 A | 6/1992 | Champion et al. |
| 5,148,365 A | 9/1992 | Dembo |
| 5,227,967 A | 7/1993 | Bailey |
| 5,237,500 A | 8/1993 | Perg et al. |
| 5,504,483 A | 4/1996 | Hoffmann |
| 5,557,517 A | 9/1996 | Daughterty, III |
| 5,668,879 A | 9/1997 | Ibaraki et al. |
| 5,668,897 A | 9/1997 | Stolfo |
| 5,689,652 A | 11/1997 | Lupien et al. |
| 5,742,775 A | 4/1998 | King |
| 5,799,287 A | 8/1998 | Dembo |
| 5,806,048 A * | 9/1998 | Kiron et al. ............ 705/36 R |
| 5,809,043 A | 9/1998 | Hassan et al. |
| 5,809,483 A | 9/1998 | Broka |
| 5,812,987 A | 9/1998 | Luskin et al. |
| 5,819,238 A | 10/1998 | Fernholz |
| 5,839,118 A | 11/1998 | Ryan et al. |
| 5,857,176 A | 1/1999 | Ginsberg |
| 5,870,720 A | 2/1999 | Chusid et al. |
| 5,875,437 A | 2/1999 | Atkins |
| 5,884,283 A | 3/1999 | Manos |
| 5,893,079 A | 4/1999 | Cwenar |
| 5,915,209 A * | 6/1999 | Lawrence ............ 340/3.7 |
| 5,946,667 A | 8/1999 | Tull et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,029,146 A | 2/2000 | Hawkins et al. |
| 6,029,148 A | 2/2000 | Zurstrassen |
| 6,035,287 A | 3/2000 | Stallaert et al. |
| 6,035,289 A | 3/2000 | Chou et al. |
| 6,049,783 A | 4/2000 | Segal et al. |
| 6,052,673 A | 4/2000 | Leon et al. |
| 6,058,379 A | 5/2000 | Odom et al. |
| 6,064,985 A | 5/2000 | Anderson |
| 6,078,904 A | 6/2000 | Rebane |
| 6,112,188 A | 8/2000 | Hartnett |
| 6,157,924 A | 12/2000 | Austin |
| 6,161,098 A | 12/2000 | Wallman |
| 6,195,647 B1 | 2/2001 | Martyn et al. |
| 6,236,972 B1 | 5/2001 | Shkedy |
| 6,253,192 B1 | 6/2001 | Corlett et al. |
| 6,278,981 B1 | 8/2001 | Dembo et al. |
| 6,304,859 B1 | 10/2001 | Ryan et al. |
| 6,338,047 B1 | 1/2002 | Wallman |
| 6,411,939 B1 | 6/2002 | Parsons |
| 6,460,021 B1 | 10/2002 | Kirksey |
| 6,578,016 B1 | 6/2003 | Trankina et al. |
| 6,601,044 B1 | 7/2003 | Wallman |
| 6,654,727 B2 | 11/2003 | Tilton |
| 6,760,710 B1 | 7/2004 | Perg |
| 6,938,009 B1 | 8/2005 | Herbst et al. |
| 6,985,880 B1 | 1/2006 | Hodgdon et al. |
| 7,020,626 B1 | 3/2006 | Eng et al. |
| 7,062,459 B1 | 6/2006 | Herbst et al. |
| 7,149,712 B2 | 12/2006 | Lang |
| 7,295,987 B2 | 11/2007 | Graff |
| 7,447,651 B1 | 11/2008 | Herbst et al. |
| 7,516,099 B2 | 4/2009 | Schneider |
| 7,644,029 B2 | 1/2010 | Perg et al. |
| 7,680,713 B2 | 3/2010 | Perg et al. |
| 7,702,550 B2 | 4/2010 | Perg et al. |
| 7,747,489 B2 | 6/2010 | Perg et al. |
| 7,752,105 B2 | 7/2010 | Perg et al. |
| 8,108,300 B2 | 1/2012 | Perg et al. |
| 2002/0077949 A1 | 6/2002 | Qasem et al. |
| 2002/0156725 A1 | 10/2002 | Harara |
| 2003/0120570 A1 | 6/2003 | Dellinger et al. |
| 2003/0229555 A1 | 12/2003 | Marlowe-Noren |
| 2003/0233324 A1 | 12/2003 | Hammour et al. |
| 2004/0107152 A1 | 6/2004 | Marlowe-Noren |
| 2004/0148249 A1 | 7/2004 | Kinnear |
| 2004/0177029 A1 | 9/2004 | Hammour et al. |
| 2004/0205020 A1 | 10/2004 | Halawi |
| 2004/0225589 A1 | 11/2004 | Marlowe-Noren |
| 2004/0225599 A1 | 11/2004 | Burgersdijk |
| 2004/0236654 A1 | 11/2004 | Marlowe-Noren |
| 2005/0075959 A1 | 4/2005 | Woodruff et al. |
| 2005/0080698 A1 | 4/2005 | Perg et al. |
| 2005/0114151 A1 | 5/2005 | Graff |
| 2005/0222927 A1 | 10/2005 | Woodley |
| 2006/0074787 A1 | 4/2006 | Perg et al. |
| 2006/0136231 A1 | 6/2006 | Thomas |
| 2006/0190373 A1 | 8/2006 | Perg et al. |
| 2006/0208061 A1 | 9/2006 | Carragher |
| 2006/0212379 A1 | 9/2006 | Perg et al. |
| 2007/0284438 A1 | 12/2007 | Carragher |

OTHER PUBLICATIONS

Amendment and Response filed in U.S. Appl. No. 10/957,399 on Mar. 24, 2008, responding to the Office Action mailed Sep. 24, 2007.
An Overview of Shariah-Compliant Funds, Qfinance, date=unknown, 3-pages.
Asset Management; ICB Magazine; London; Nov./Dec. 1994; Kirby, Anthony.
Balasundram Maniam, "Perception of Islamic financial system: Its obstacles in application, and its marker", Academy of Accounting and Financial Studies Journal. Cullowhee: May 2000. vol. 4, Iss. 2; p. 1-8.
"Canada Real Return Bonds," http://www.bankofcanada.ca/en/pdf/real.sub.—return.sub.—eng.pdf, Nov. 24, 1994, 9 pages.
Feldman, A., Leslie Haggin, Laura Lallos, Teresa Tritch, et al. The Ultimate Guide to Retirement: Your Retirement Questions. Money. New York: Jul. 2000. vol. 29, Iss. 7; p. 72, 17 pgs, ProQuest document, 15 pages.
Herbst, Anthony F. and Nicholas O. Ordway. "Stock Index Futures Contracts and Separability of Returns." The Journal of Futures Markets, vol. 4, No. 1, pp. 87-102 (1984).
Herbst, Anthony F., Joseph P. McCormack, Elizabeth N. West. "Investigation of Lead-Lag Relationship between Spot Stock Indices and Their Futures Contracts." The Journal of Futures Markets, vol. 7, No. 4, pp. 373-381 (1987).
Hill, Joanne M. & Naviwala, Humza, Synthetic and Enhanced Index Strategies using Futures on U.S. Indexes. (Special Theme: Derivatives and Risk Management), May 1999, Journal of Portfolio Management, pp. 61-74.
International Search Report for PCT/US2005/023864, filed Jul. 5, 2005. pp. 1-2.
The Text of the Historic Judgment on Interest, Given by the Supreme Court of Pakistan, by Justice Muhammad Tagi Usmani, 76 pages.
Islamic banking, Wikipedia, accessed Apr. 5, 2011, 2-pages.
Islamic Banks: A Novelty No Longer, Bloomberg Businessweek, Aug. 8, 2005, 2-pages.
May, Gregory, Using Synthetic Investments, Jun. 1997, International Tax Review v8n6 pp. 23-29.
McGinn, Daniel. "The Ultimate Guide to Indexing." Bloomberg, Sep. 1999, pp. 66-83.
Miller, Todd and Timothy S. Meckel. "Beating Index Funds with Derivatives." The Journal of Portfolio Management, May 1999, pp. 75-87.
Morris et al., "Your Guide to Understanding Investing", published by Lightbulb Press Inc., 1999, 21 pages cited.
Morris, V. & Shaykh Yusuf Talal DeLorenzo, Guide to Understanding Islamic Home Finance, Lightbulb Press, 32 pages cited.

Mutual funds: Ranking the funds, Financial World; New York; Badenhouser, Kurt; Mar. 18, 1997; pp. 53-67.

Notification Concerning Transmittal of International Preliminary Report on Patentability for PCT/US2005/044280, dated Mar. 26, 2009. pp. 1-5.

Novomestky, Frederick, A Dynamic, Globally Diversified, Index Neutral Synthetic Asset Allocation Strategy, Management Science; Jul. 1997; 43, 7; ABI/INFORM Global, p. 998.

Office Action dated Sep. 24, 2007, from U.S. Appl. No. 10/957,399.

PCT International Search Report for PCT/US05/34387, filed Apr. 24, 2006. pp. 1-2.

PCT International Search Report and Written Opinion of the International Searching Authority for PCT/US06/08108, filed Mar. 7, 2006, 6 pages.

PIMCO Funds. "PMCO Stocks Plus Fund." (Aug. 19, 1999) 12 Pages, http://www.pimcofunds.com.

Richard De Belder, "Middle East: An overview of project finance and Islamic finance", International Financial Law Review. London: Jul. 1999. p. 1-6.

Risk Watch, http://www.algorithmics.com/products/riskwatch1.html accessed Feb. 10, 2000, 8 pages.

Robert Fugard and Olga Petrovic, from Linklaters, "Think Islamic", Airfinance Journal. Coggeshall: Sep. 2004. p. 1-5.

Shariah-compliant funds: A whole new world of investment, PriceWaterhouseCoopers, 2009, 14-pages.

Steering Clear of Derivatives Risk, Treasury Management Association Journal; Atlanta; Sep./Oct. 1995; Chung, Ronald K; Fung, Hung-Gay.

Summary of Marketable Treasury Inflation-Protected Securities, single page, http://www.treasurydirect.gov/instit/statreg/auctreg/auctreg_gsrlist.htm.

The changing face of Islamic banking; De Belder, Richard T, Khan, Mansoor Hassan; International Financial Law Review. London; Nov. 1993. vol. 12, Iss. 11; 5-pages.

The Wall Street Journal; 'Synthetic' Stock; Future Stand-in for the Real Thing, Oct. 1990, ProQuest 3 pages.

Unlocking Islamic Finance, Part 1; Khalili, Sara; Infrastructure Finance; Apr. 1997; 4 pages.

"United Kingdom Debt Management Office: Gilt Market", three pages cited, http://www.dmo.gov.uk/index.aspx?page=Gilts/Indexlinked.

Written Opinion of the International Searching Authority and International Search Report for PCT/US2005/023864, filed Jul. 5, 2005. pp. 1-5.

Lange, Jeffrey A, Financial Instruments Disclosure: FASB's Statement 107 is Amended by Statement 119, Oct. 28, 2000, pp. 1-7.

Fair Value by Financial Accounting Standards Board, updated Oct. 24, 2000, pp. 1-5.

SEC Proposed Rules 17 CFR Parts 210,228,229,239,240 aqnd 249 RIN 3235-AG42 and 3535-AG77 for derivative financial instruments and other financial instruments, pp. 1-5.

26 CFR Ch 1 (4-1-00 Edition), section 1.707-0 to 1.707-4 indexed, p. 426.

* cited by examiner

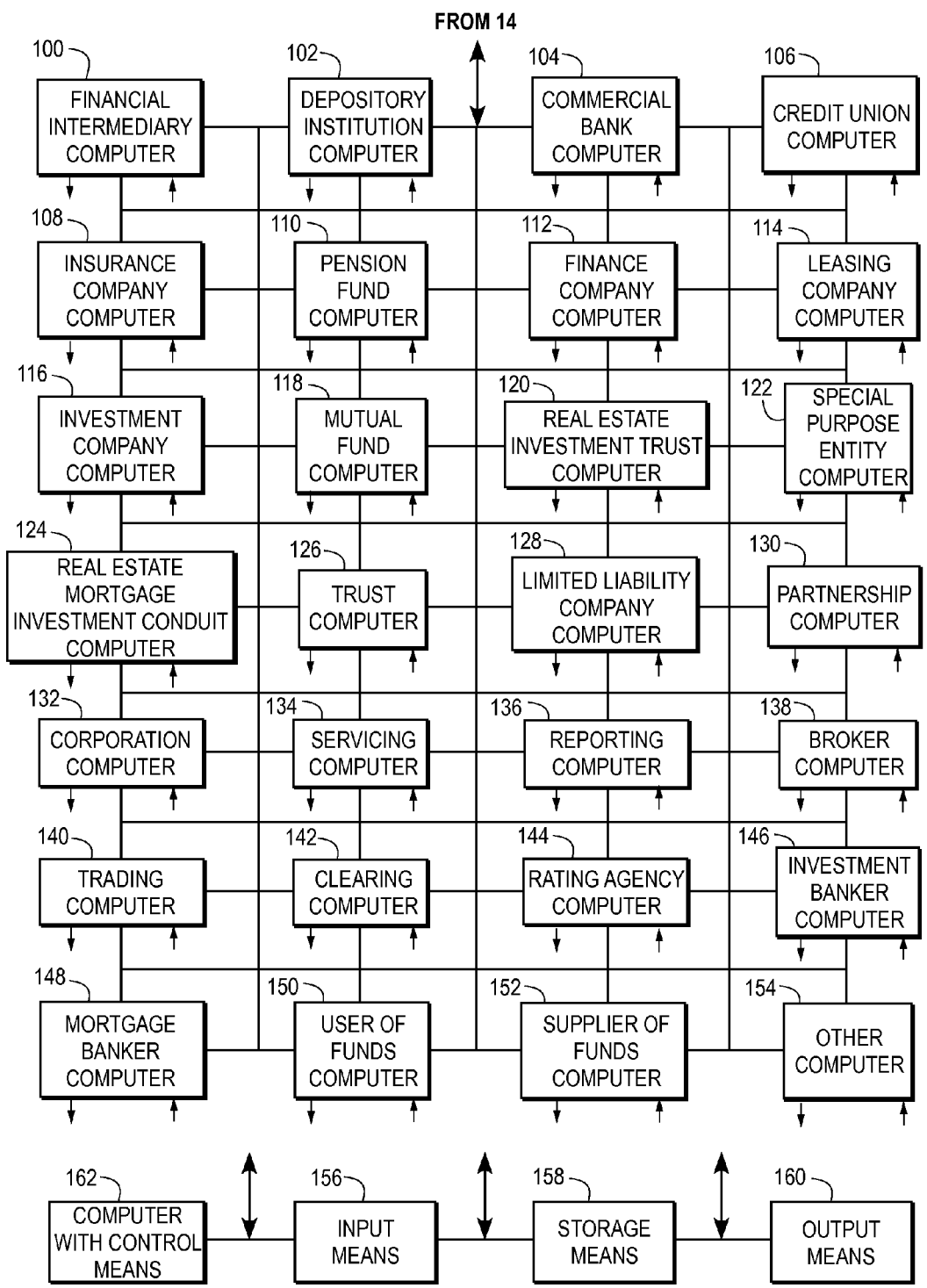

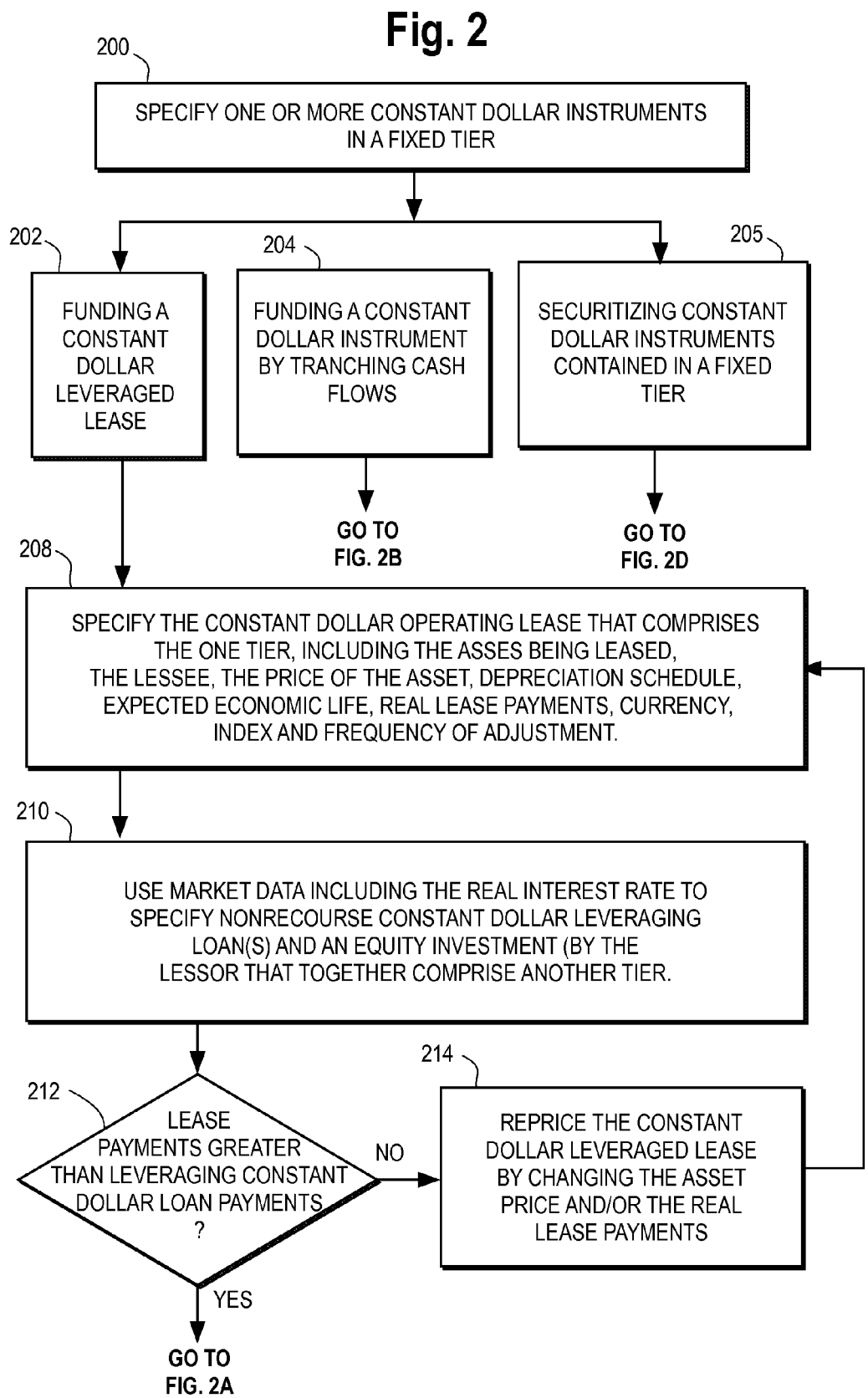

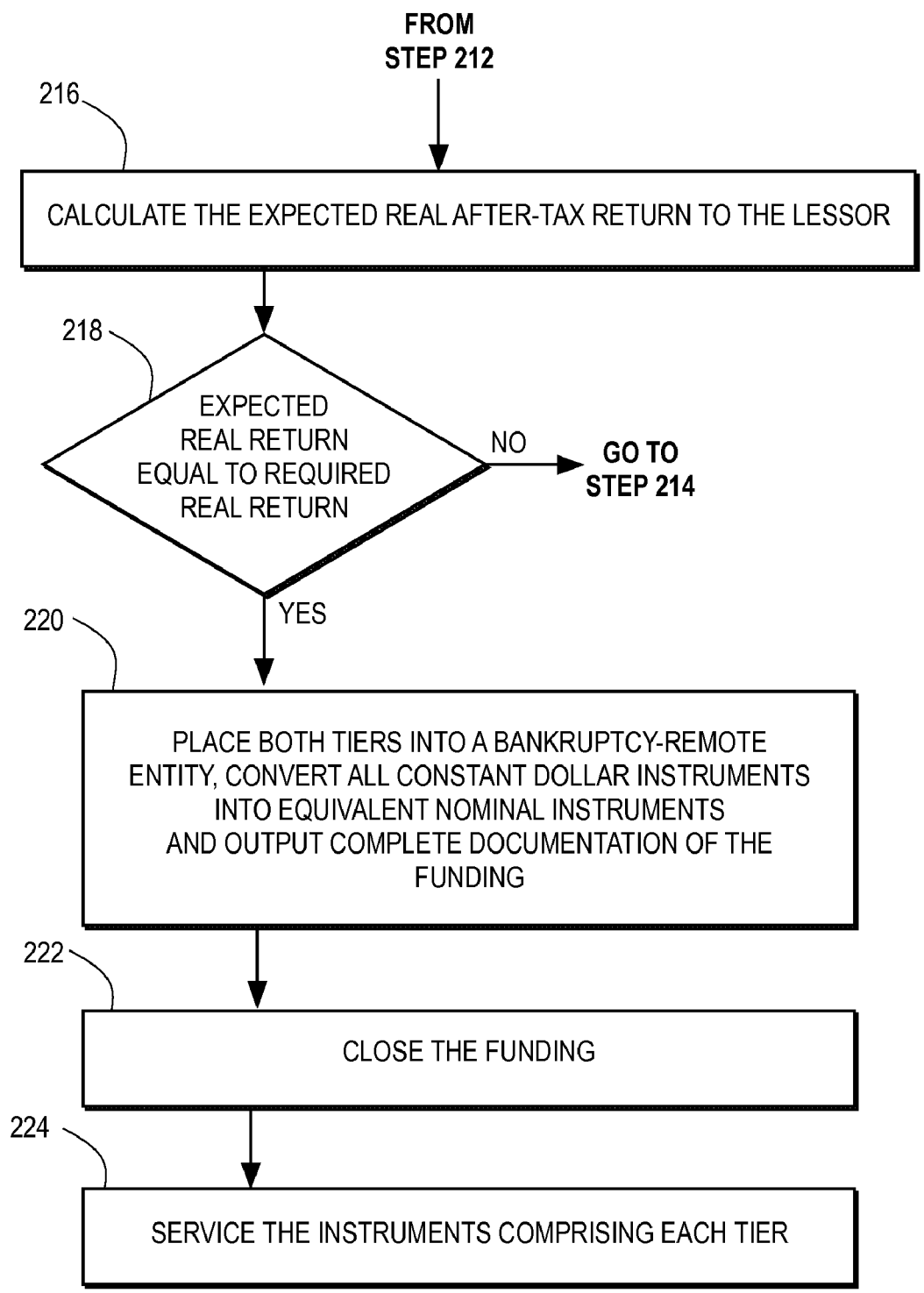

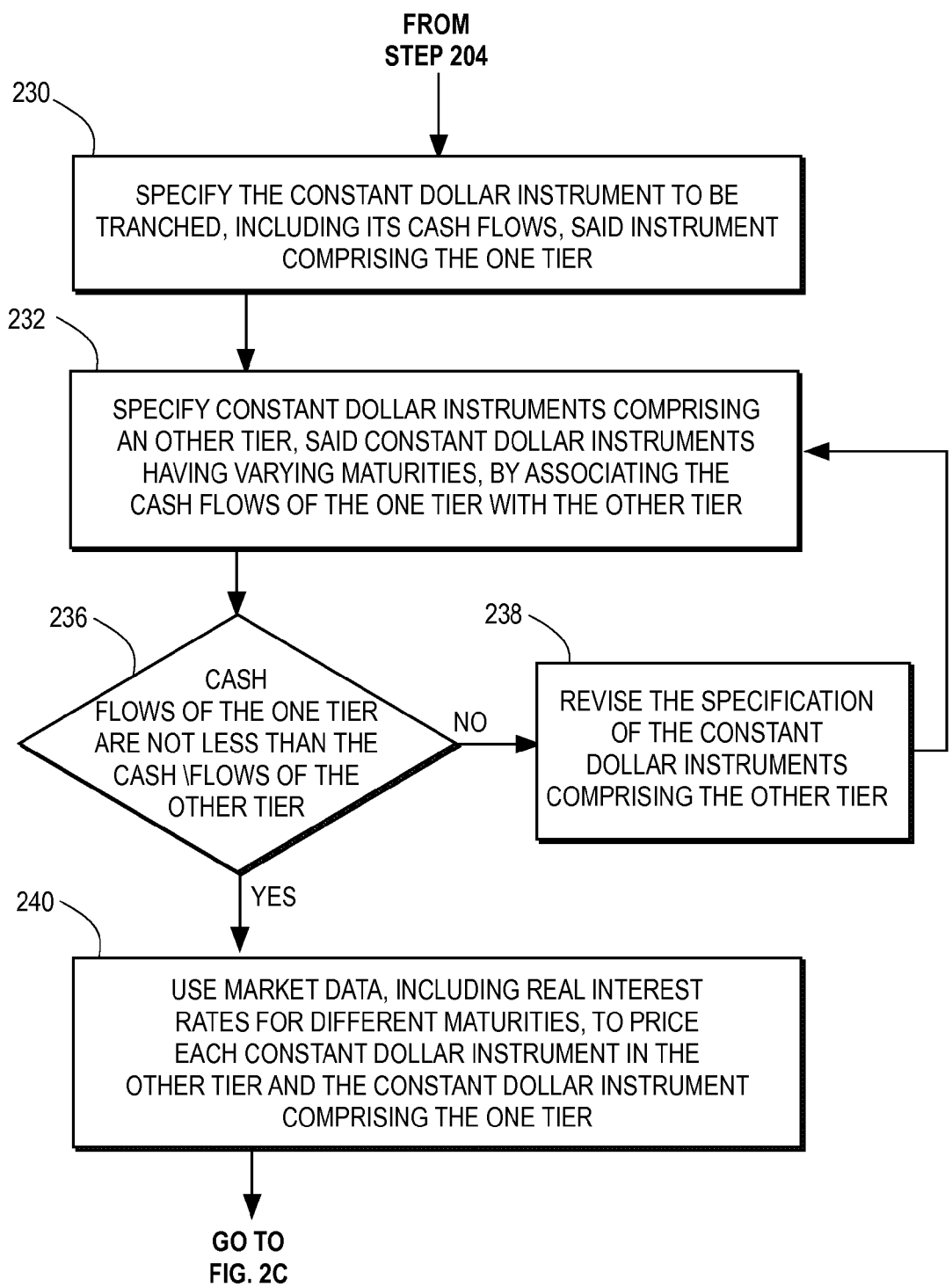

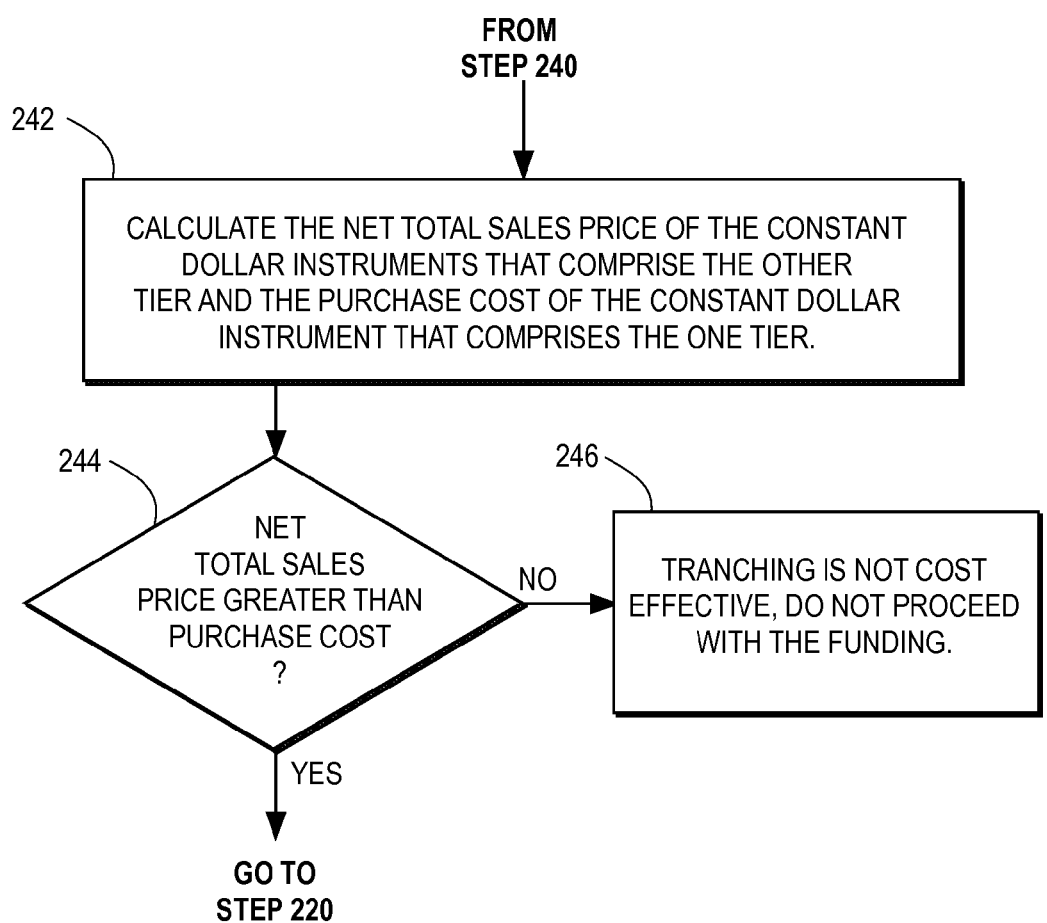

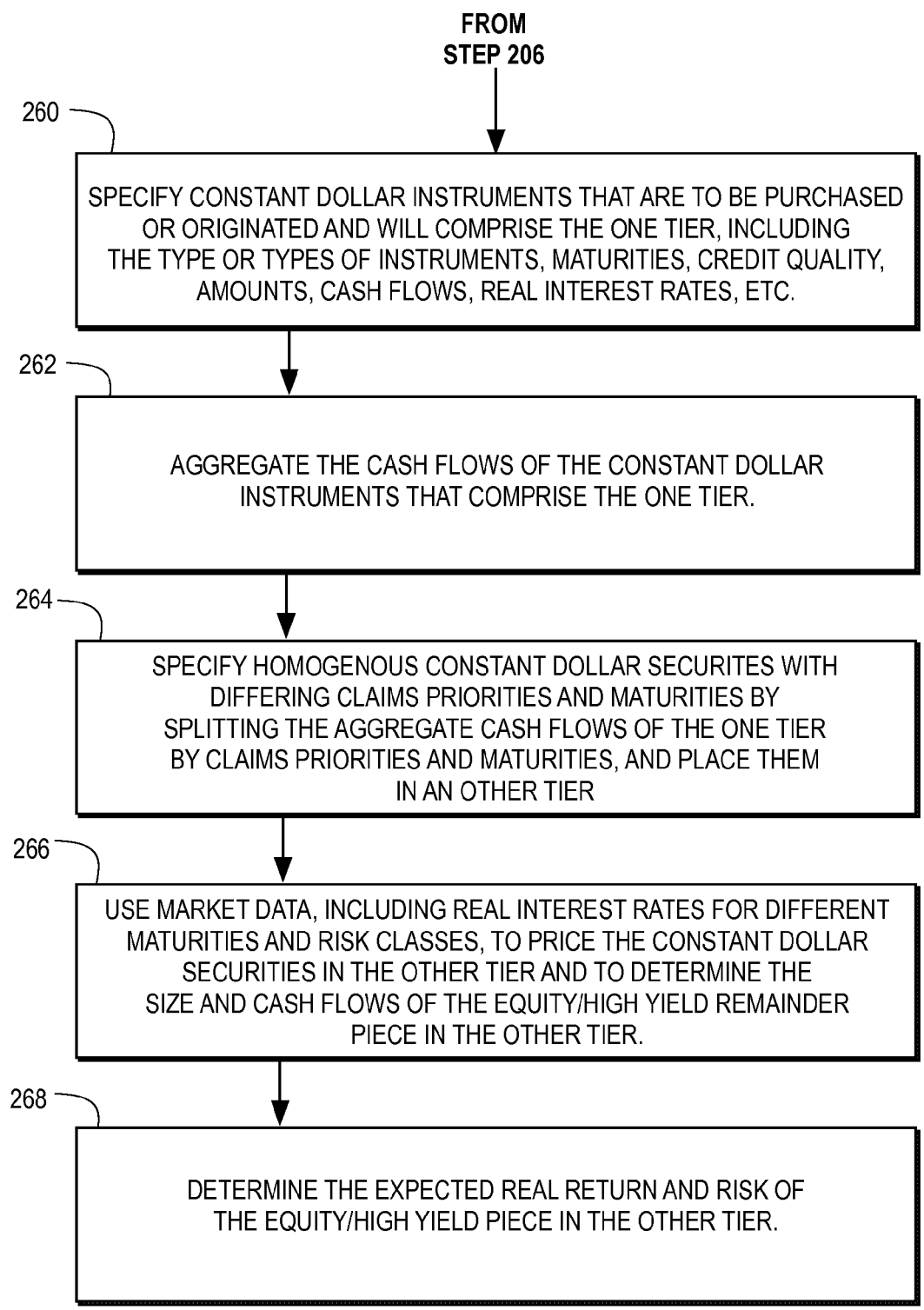

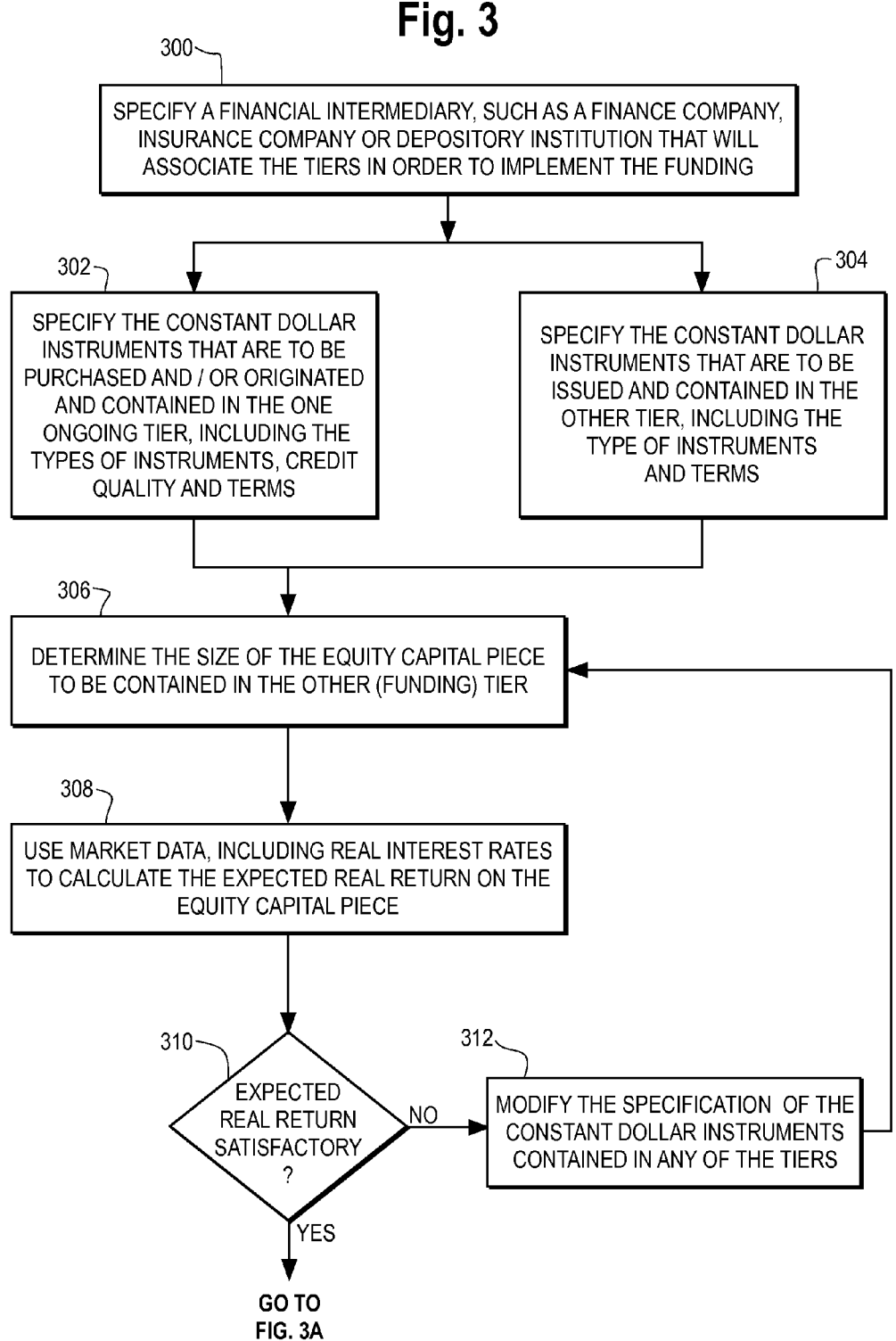

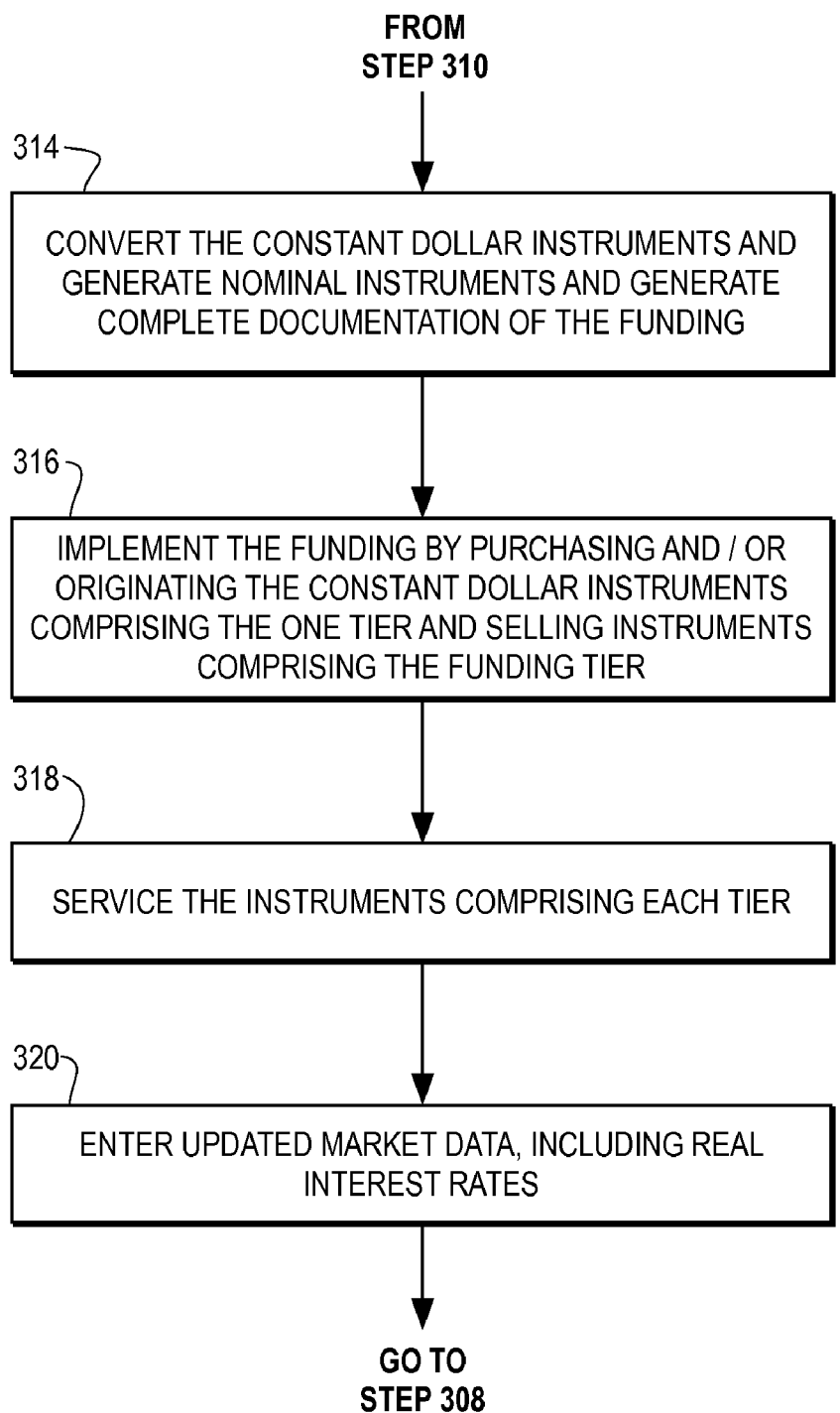

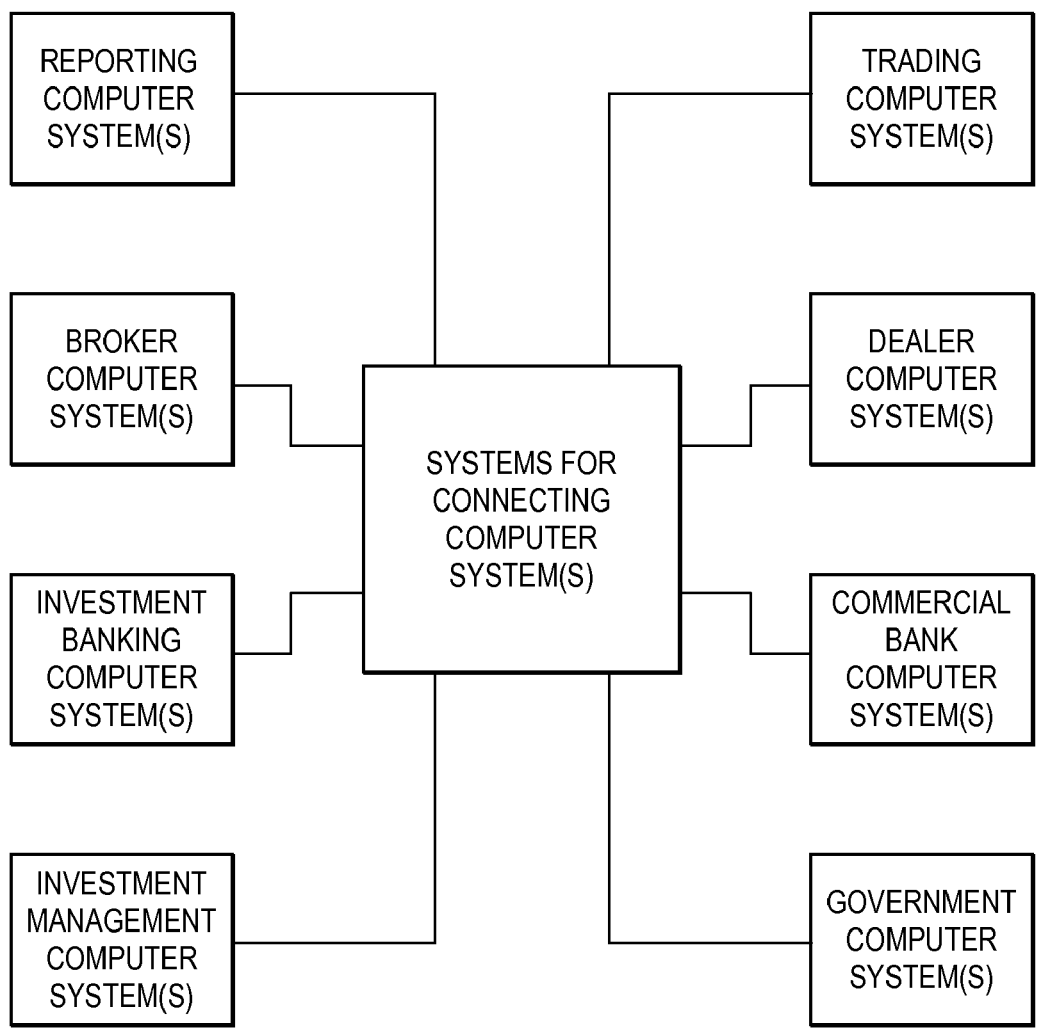

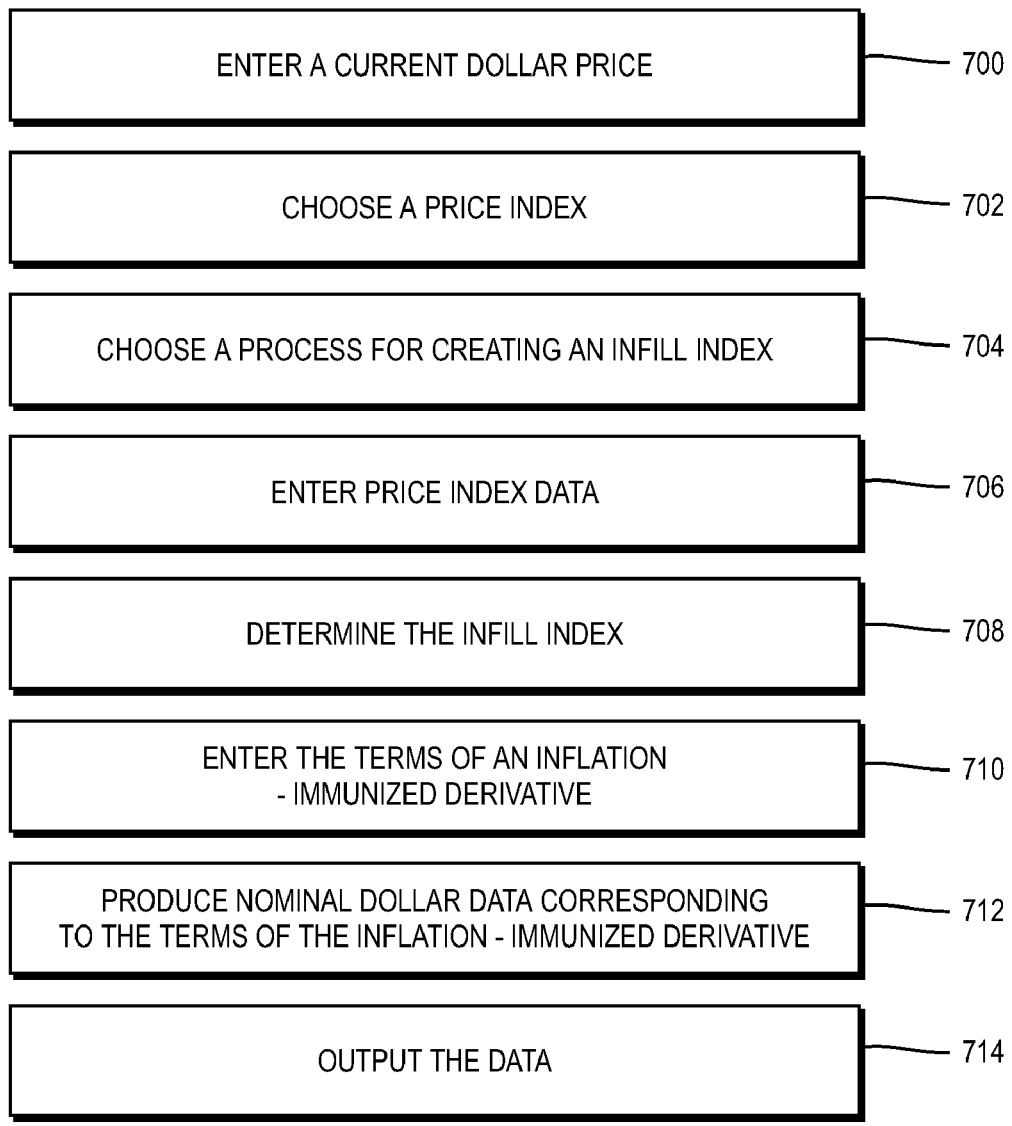

COMPUTER-AIDED PROCESS FOR INFLATION-IMMUNIZED DERIVATIVES

I. PRIORITY STATEMENT

This patent application claims priority from and is a Continuation of, and incorporates by reference, U.S. patent application Ser. No. 11/368,728, filed Mar. 6, 2006, now U.S. Pat. No. 7,680,713, issued on Mar. 16, 2010 which was a non-provisional of U.S. Provisional Patent Application Ser. No. 60/775,285, filed on Feb. 21, 2006 and a Continuation-in-part of U.S. patent application Ser. No. 11/074,121, filed on Mar. 7, 2005, now U.S. Pat. No. 7,752,105, issued on Jul. 6, 2010, which was a Continuation-in-part of U.S. patent application Ser. No. 10/957,399, filed on Oct. 1, 2004, now U.S. Pat. No. 7,747,489, issued on Jun. 29, 2010. This patent application also claims priority from and is a Continuation of, and incorporates by reference, U.S. patent application Ser. No. 10/885,442, filed Jul. 6, 2004, now U.S. Pat. No. 7,702,550, issued on Apr. 20, 2010, which was a Continuation-in-part of U.S. patent application Ser. No. 09/283,102, filed on Mar. 31, 1999, now U.S. Pat. No. 6,760,710, issued on Jul. 6, 2004. Each said patent and application is incorporated as if fully reproduced in every way herein, and fully claimed priority as well.

II. TECHNICAL FIELD

The technical field is computers, computer-aided methods, computer control means, and data processing systems, as illustrated more particularly herein. Exemplary embodiments include, depending on the implementation, apparatus, a method for funding, a method for pricing, a method for servicing, a method for risk management, a method for acquiring and selling, and corresponding products produced thereby, as well as data structures, computer-readable media tangibly embodying program instructions, computer-generated documentation, manufactures, and necessary intermediates of the foregoing.

III. BRIEF DESCRIPTION OF THE DRAWINGS

Figure 1B:
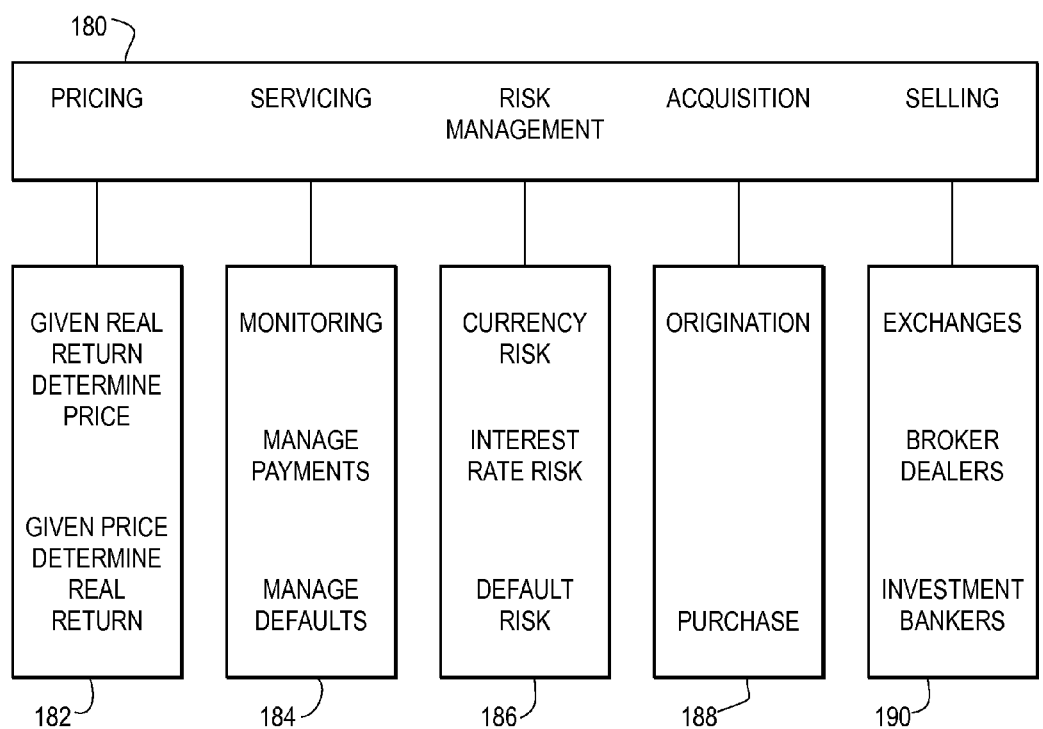
Figure 2E:
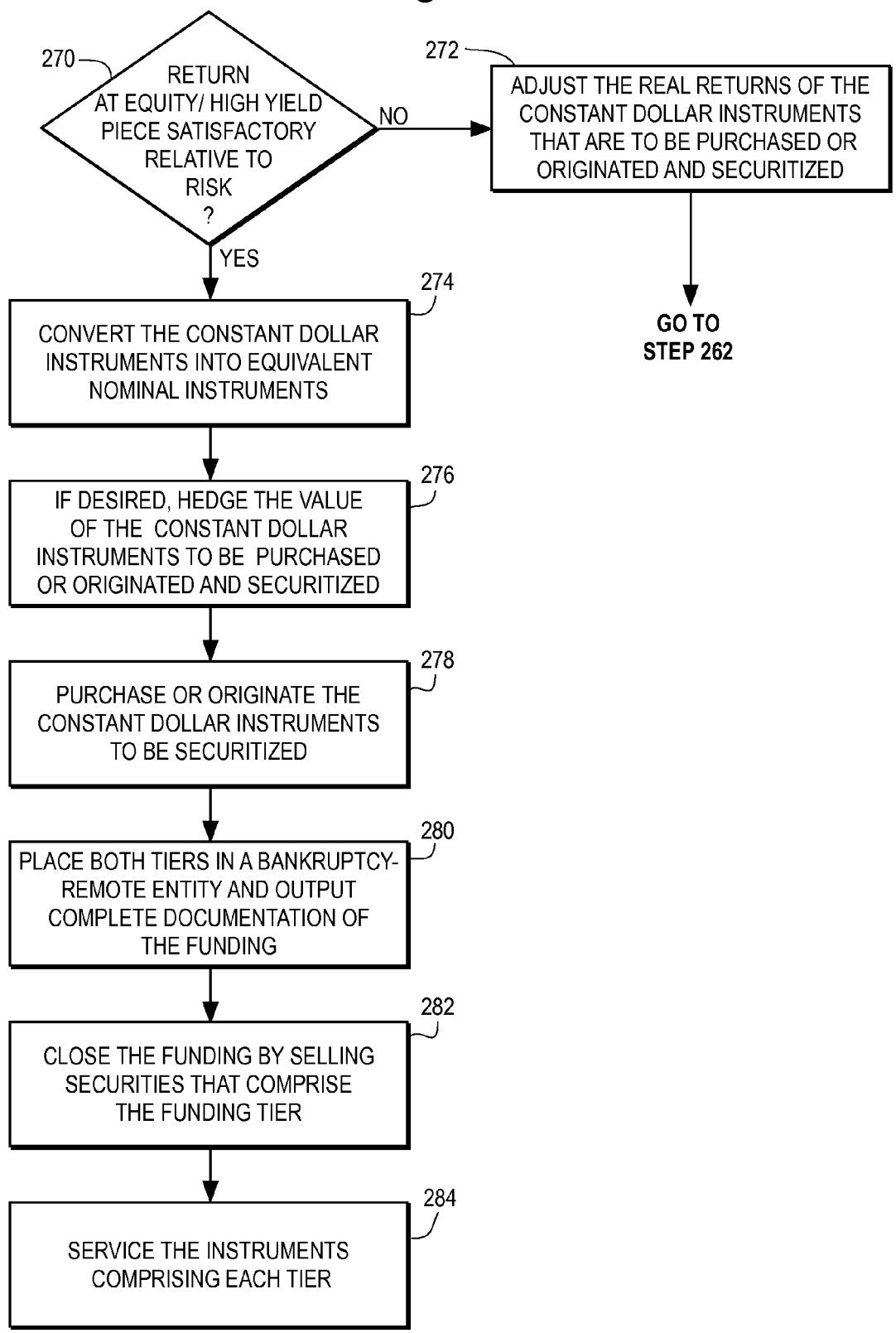
Figure 4:
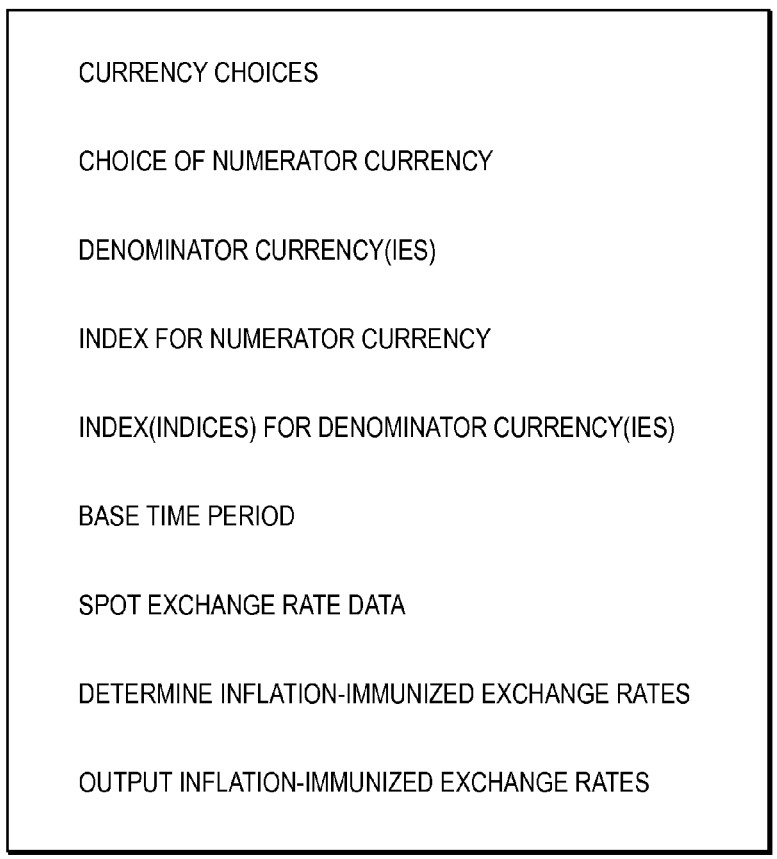
Figure 5:
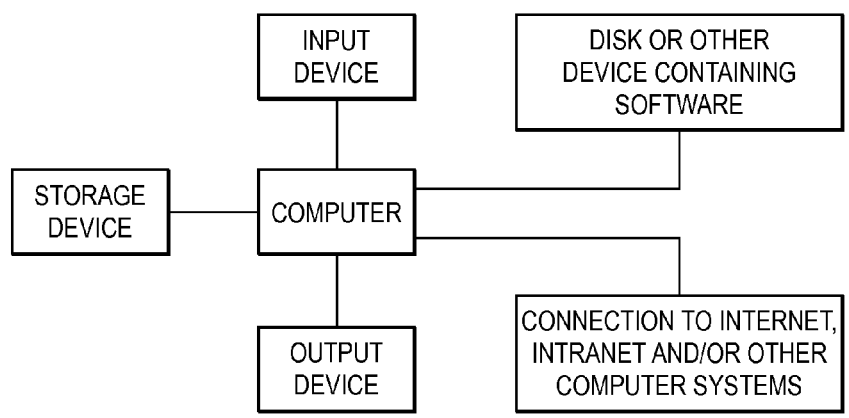
Figure 6:
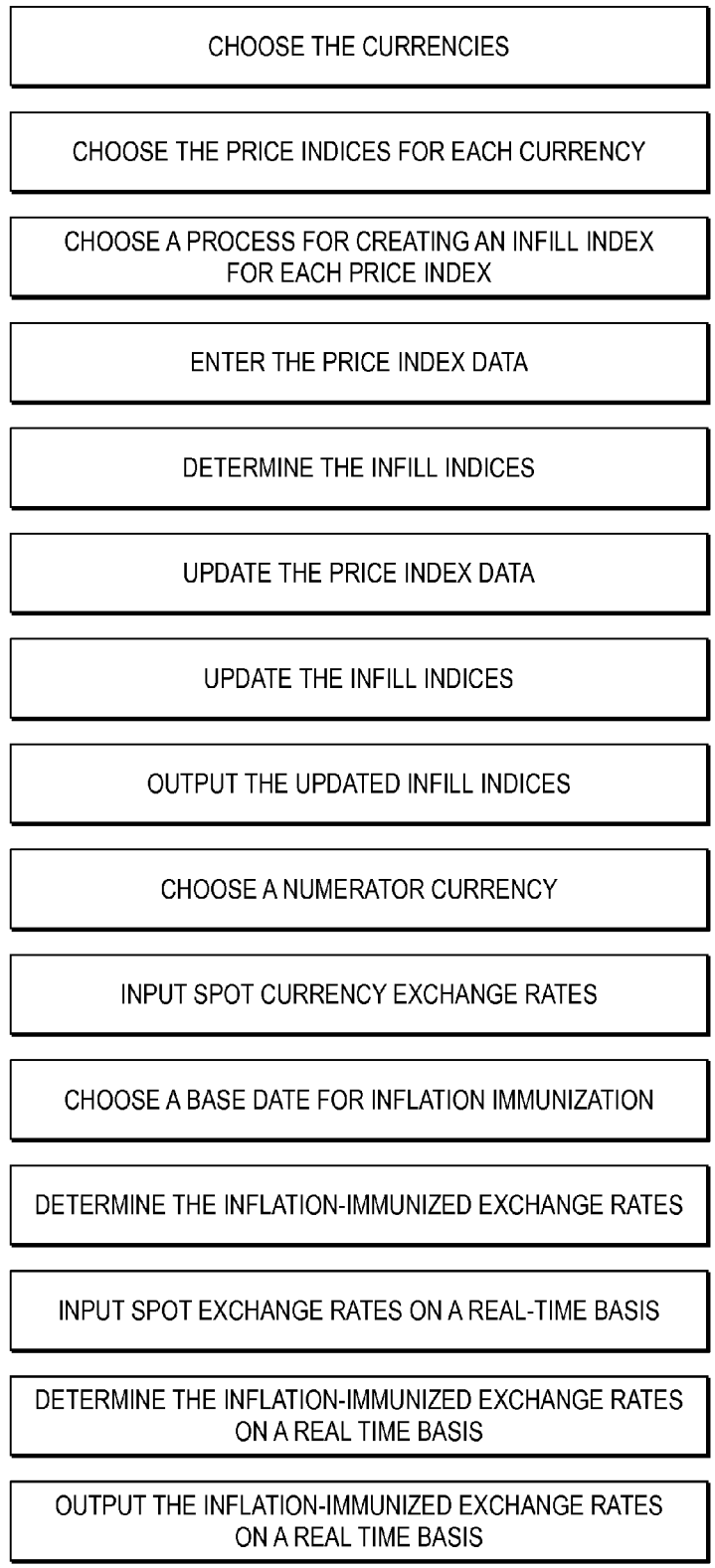

FIG. 1 is an illustration of an embodiment.
FIG. 1A is an illustration of an embodiment;
FIG. 1B is an illustration of an embodiment;
FIG. 2 is an illustration of a flow chart for an embodiment.
FIG. 2A is an illustration of a flow chart for an embodiment.
FIG. 2B is an illustration of a flow chart for an embodiment.
FIG. 2C is an illustration of a flow chart for an embodiment.
FIG. 2D is an illustration of a flow chart for an embodiment.
FIG. 2E is an illustration of a flow chart for an embodiment.
FIG. 3 is an illustration of a flow chart for an embodiment.
FIG. 3A is an illustration of a flow chart for an embodiment.
FIG. 4 is an illustration of an embodiment.
FIG. 5 is an illustration of an embodiment.
FIG. 5A is an illustration of an embodiment.
FIG. 6 is an illustration of a flow chart for an embodiment.
FIG. 7 is an illustration of a flow chart for an embodiment.

IV. MODES

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability/technical affect is clear from the description, and is also stated below, e.g., as regards controlling a computer system, or part thereof, so as to affect efficiency management of computer resources, rate and manner of data transfer (e.g., by way of standardizing data by template input or computers in the system adapted to cooperate such as by "knowing" the format, order, and/or significance to attribute to data being transmitted/received.

As used herein, "embodiment" should not be construed as the sole manner, but rather as an illustrative teaching, much as though teaching mathematical addition does not require setting out every numerical combination to convey the concept extending beyond the teaching examples.

By way of the following prophetic teaching, consider that there is provided computer support, as in a data processing system, for implementing funding, including a private constant-dollar instrument. Said computer support for this computer-aided method of funding may be implemented by one computer system or it may be implemented by multiple computers that may be connected or networked together in an ongoing manner, intermittently, or one time. If implemented by more than one computer, the system may include at least one from a group including, but not limited to: a financial intermediary computer; a depository institution computer; a commercial bank computer; a credit union computer; an insurance company computer; a pension fund computer; a finance company computer; a leasing company computer; an investment company computer; a mutual fund computer; a real estate investment trust computer; a special purpose entity computer; a real estate mortgage investment conduit computer; a trust computer; a limited liability company computer; a partnership computer; a corporation computer; a servicing computer; a reporting computer; a broker computer; a trading computer; a clearing computer; a rating agency computer; an investment banker computer; a mortgage banker computer; a user of funds computer; a supplier of funds computer; and an other computer.

A servicing computer may be any computer that is servicing any financial instrument in any of the plurality of tiers of instruments. A broker computer may be the computer of a mortgage broker, a securities broker, a broker/dealer, and/or a broker's broker. Other computers that might be connected at some time and thus participate in the computer-aided method of funding include, but are not limited to: a business computer, a nonfinancial corporation computer, a financial institution computer, a consumer computer, a household computer, a student computer, an educational institution computer, a religious institution computer, a charitable institution computer, an academic computer, a researcher computer, a foreign investment-creating computer, a foreign servicing computer, a foreign investment banker computer, a foreign mortgage banker computer, a foreign trading computer, a foreign broker computer, a foreign rating agency computer, a foreign reporting computer, a foreign investment manager computer, a foreign investment advisor computer, a foreign bank computer, a foreign insurance computer, a foreign pension fund computer, a foreign clearing computer, a foreign investor computer, a foreign accounting computer, a foreign issuer computer, a foreign financing company computer, a foreign leasing company computer, a foreign business computer, a foreign nonfinancial corporation computer, a foreign financial institution computer, a foreign business computer, a foreign consumer computer, a foreign household computer, a foreign student computer, a foreign educational institution computer, a foreign religious institution computer, a foreign charitable institution computer, a foreign academic computer, and/or a foreign researcher computer.

If the computer-aided method of funding does involve more than one computer, the computers that may be part of the computer system may connect into the system on a continuing basis, intermittently, or on a one-time basis. Any computer that may be involved, regardless of whether one or more is involved, may be in any form or combination, including, but not limited to: a mainframe computer and terminal(s) configuration, a client/server computer configuration, a configuration comprised of a personal computer, a desk-top computer, a lap-top computer, a pocket computer, a palm computer, a personal digital assistant, a digital cell phone or other portable device, but other ways of thinking, embodiments can extend to comprising a Wi-Fi node, an embedded processor, a car or other vehicle computer, a light-wave computer, a biological or hybrid computer, a quantum computer, etc.

If more than one computer is involved, the computers may be connected, or not connected, in any pattern. The connections need not be continuously maintained; they may be intermittent, one-time or ongoing. One or more of these connections may involve the use of the Internet, an intranet, e-mail, instant messaging, text messaging, voice mail, a local area network (LAN), a wide area network (WAN), a twisted pair of copper wires, a coaxial cable, a cellular network, Wi-Fi, wide area Wi-Fi, a Wi-Fi network, a light-wave transmission, infrared, and/or a wireless connection. One of more of the connections may involve one-way communication only. One or more may involve two-way communication. Real time communications are another possibility.

More than one of any variety of computer may be involved in the computer-aided method of funding. For example, there may be more than one user of funds computer, more than one supplier of funds computer, more than one broker computer, etc.

Private constant-dollar financial instruments can be financing instruments issued by (i.e., they are liabilities of or interests in) funds users who are subject to default risk, including (but not limited to): individuals, households, for-profit businesses, corporations, partnerships, limited partnerships, sole proprietorships, financial intermediaries, depository institutions, banks, credit unions, thrifts, savings and loans, savings banks, insurance companies, investment companies, real estate investment trusts (REITS), limited-liability companies, not-for-profit businesses, nongovernmental organizations, trusts, real estate mortgage investment conduits (REMICS), other pass-through entities, municipal governments (state and local governments), agencies of municipal governments, school districts, water districts, transportation districts, other special purpose districts, and federally sponsored enterprises (e.g., Federal National Mortgage Association, Federal Home Loan Mortgage Corporation, etc.). The issuers of private constant-dollar financial instruments may be domiciled in the U.S. or in other countries. The private constant-dollar instruments may be denominated in U.S. dollars or any other currency. Note that embodiments herein can also be applied to commodities, such as oil.

Unlike the federal government, the issuers of private constant-dollar financial instruments do not have the power to print money. Therefore, unlike securities issued by the national or federal government, private constant-dollar financial instruments are subject to default risk and this default risk may be reduced by matching the payments promised by the instruments to the expected future revenues of the issuer. The fixed real (purchasing power) payments of the private constant-dollar financial instruments can be tailored to produce a reasonable, or even the best possible, match between promised real payment amounts and the expected future real revenues of the issuer, thus reducing the default risk relative to alternative instruments which do not have fixed real payments and cannot, therefore, be tailored to produce a reasonable, or even the best possible, match between promised payments and expected future real revenues.

Note that the use of the U.S. government is illustrative, as the concept applies equally well to other governments that have the power to print money.

Constant-dollar financial instruments are financial instruments whose terms (e.g., payment amounts, rate of return or interest rate, schedule of remaining principal balances, etc.) can be specified in units of constant purchasing power, such as dollars that have been adjusted using an index such as a price index (for example, one of the variations of the Consumer Price Index) so as to maintain constant purchasing power. However, the term "constant-dollar financial instrument" can apply to financial instruments whose terms are specified in units that are held constant in purchasing power and/or are adjusted through the application of some suitable index.

The units that are held constant in purchasing power and/or are adjusted by an index may be any currency (not just dollars) and they may be held constant and/or adjusted by any desired price index or other economic index. Said currency may be any national currency (e.g., U.S. dollars, Canadian dollars, Australian dollars, Mexican pesos, British pounds, Swiss francs, euros, yen, rubles, zlotys, Danish kroner, etc.) or any other variety of currency including private and/or local currencies. Possible varieties of said price or other index may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index, an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.)

This context for the term "constant-dollar financial instrument" is applicable herein, and private constant-dollar financial instruments may be comprised of, utilize and/or be derived from one or more other private constant-dollar financial instruments, where the term "constant-dollar financial instrument" applies to instruments whose units that are held constant may be any currency adjusted by any desired price index or other economic index.

Private constant-dollar financial instruments may or may not be "private" in the sense that the data regarding the instrument or the issuer is private. Indeed, in the case of a public issue of private constant-dollar financial instruments, federal and state securities laws mandate extensive public disclosure of data regarding both the securities and the issuer of the securities.

Constant-dollar financial instruments may be converted into equivalent nominal-dollar financial instruments because payments presently are made in nominal dollars and because accounting, both for purposes of reporting and for calculating taxes, is presently carried out in terms of nominal dollars. Two processes have been invented for performing said conversion, both by an inventor herein. The first is disclosed in U.S. Pat. No. 5,237,500 and the second is disclosed in U.S. patent application Ser. No. 09/283,102, U.S. Pat. No. 6,760,710 B1, both incorporated by reference herein. The U.S. patent application titled "MULTIPLE COMPUTER SYSTEM SUPPORTING A PRIVATE CONSTANT-DOLLAR FINANCIAL PRODUCT" which was filed on Jul. 6, 2004 as a continuation-in-part of U.S. Pat. No. 6,760,710 B1 is also incorporated by reference herein.

One embodiment is directed to managing a computer-aided method of funding, including a private constant-dollar financial instrument, may include the step of converting any of said private constant-dollar instruments into an equivalent nominal instrument. Various embodiments of the computer control means (FIG. 1B) may include computer-aided methods for: 1) pricing private constant-dollar instruments; 2) servicing private-constant dollar instruments; 3) managing the risk of private constant-dollar instruments; 4) the acquisition of private constant-dollar instruments; and/or 5) the sale of private constant-dollar instruments.

The value of a private constant-dollar instrument may be impacted by a variety of factors, including but not limited to: 1) the credit quality of the instrument; 2) the real return of the instrument; 3) the frequency with which nominal currency amounts are adjusted by the index (i.e., the frequency of adjustment); 4) the index that is used to adjust the nominal currency amounts; and, 5) the underlying currency (e.g., U.S. dollars, euros, yen, pesos, etc.).

The value of a tier of financial instruments may be determined by determining the value of the instruments comprising the tier. Therefore, in an illustrative embodiment (teaching, not to be confused with limiting by way of the teaching) may include the steps of determining a value of a tier responsive to: 1) credit quality of the instruments comprising the tier; 2) the real return of the instruments comprising the tier; 3) the frequency of adjustment of the instruments comprising the tier; 4) the index (or indices if more than one index) used to adjust the nominal currency amounts of the instruments comprising the tier; and, 5) the underlying currency or currencies of the instruments comprising the tier.

Private constant-dollar financial instruments that hold purchasing power constant (by adjusting the nominal currency amounts by an agreed upon price index) are distinguished from other private financial instruments (i.e., financial instruments that are not constant-dollar instruments) by their virtual elimination of inflation risk and their ability to reduce default risk. They may also reduce interest rate risk because real interest rates are less volatile than nominal interest rates. Further, they may facilitate international finance by eliminating the inflation component of currency risk. An embodiment may include a computer control means (FIG. 1B) for a computer-aided method of managing the real currency risk that remains after the inflation component of currency risk has been eliminated. The computer-aided method may use inflation-immunized currency derivatives, including inflation-immunized currency futures, inflation-immunized currency forwards, inflation-immunized currency options, and/or inflation-immunized currency swaps in order to manage real currency risk.

A further embodiment may include a computer control means for managing the real price risk (changes in the real, inflation-adjusted price) of commodities, goods and services and financial instruments using inflation-immunized derivatives, including inflation-immunized futures, inflation-immunized forwards, inflation-immunized options, and/or inflation-immunized swaps. Inflation-immunized derivatives that are used to manage the real price risk of constant-dollar financial instruments may be referred to as constant-dollar derivatives (e.g., constant-dollar futures, constant-dollar forwards, constant-dollar options, constant-dollar swaps, etc.).

In an other embodiment, an automated auction market for inflation-immunized derivatives may facilitate the management of real price risk of all kinds, including real currency risk.

Examples of private constant-dollar financial instruments include, but are not limited to:
1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, including a constant-dollar reverse mortgage which enables a consumer to tap the equity in their residence by receiving payments of constant purchasing power amounts, with the resulting constant-dollar loan being repaid through the sale of the residence at some defined point.
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to finance real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds including bullets, serials, zero-coupon and combinations thereof.
25. Constant-dollar fully-amortizing bonds.

26. Constant-dollar partially-amortizing bonds.
27. Constant-dollar bonds or loans or loans with any desired amortization structure.
28. Constant-dollar bonds with sinking funds.
29. Constant-dollar private placement bonds.
30. Constant-dollar public issue bonds.
31. Constant-dollar medium-term notes, which are constant-dollar bonds (that can be of any maturity, in spite of the name) that are issued on a continuing basis over time rather than through the batch process of traditional underwriting.
32. Constant-dollar debentures.
33. Constant-dollar subordinated debentures.
34. Constant-dollar capital notes.
35. Constant-dollar mortgage bonds.
36. Constant-dollar equipment trust certificates.
37. Constant-dollar asset-backed securities.
38. Constant-dollar mortgage-backed securities.
39. Constant-dollar preferred stock.
40. Constant-dollar fully-amortizing preferred stock.
41. Constant-dollar limited partnership units.
42. Constant-dollar preferred-return LLC (Limited Liability Company) units.
43. Constant-dollar income bonds, where the issuing organization makes the promised real (purchasing power) payment only if it has income sufficient to make the payment. Payments that are not paid may cumulate with or without compounding (payment of interest on interest).
44. Constant-dollar deposits.
45. Constant-dollar certificates of deposit.
46. Constant-dollar Eurodollar deposits.
47. Constant-dollar currency, which is created when constant-dollar deposits are made checkable and/or transferable through electronic funds transfer means.
48. Constant-dollar insurance.
49. Constant-dollar whole life policies.
50. Constant-dollar universal life policies.
51. Constant-dollar variable life policies.
52. Constant-dollar annuities.
53. Constant-dollar fixed annuities.
54. Constant-dollar guaranteed investment contracts.
55. Constant-dollar municipal bonds.
56. Constant-dollar tax-exempt bonds.
57. Constant-dollar general obligation bonds.
58. Constant-dollar revenue bonds.
59. Constant-dollar double barrel bonds.
60. Constant-dollar instruments with variable real returns.
61. Constant-dollar instruments with caps and/or floors on the equivalent nominal returns.
62. Constant-dollar instruments with caps or restrictions on the nominal payment amounts.
63. Constant-dollar instruments with caps or restrictions on the nominal balance amounts.
64. Constant-dollar instruments convertible into other constant-dollar instruments.
65. Constant-dollar instruments that include options.
66. Constant-dollar instruments with the option to choose a different (constant purchasing power) currency—e.g., constant euros, constant yen, constant pounds, constant pesos, etc.
67. Constant-dollar instruments with the option to choose a different index—e.g., a services cost index, a commodity cost index, a gold price index, an oil price index, an energy price index, etc.
68. Constant-dollar instruments convertible into common stock.
69. Common stock convertible into constant-dollar instruments.
70. Constant-dollar instruments with warrants attached.
71. Constant-dollar instruments convertible into nominal instruments.
72. Nominal instruments convertible into constant-dollar instruments.

The user of the funds (issuer of the constant-dollar instrument) may be domiciled in U.S. and/or another country. The underlying currency may U.S. dollars, Canadian dollars, Mexican pesos, British pounds, euros, yen, Australian dollars or any other currency. The instrument may offer the investor and/or the issuer the option to choose from a list of one or more currencies and/or one or more indices.

Private constant-dollar financial instruments may also include financial instruments that are derived from one or more other private constant-dollar financial instruments. Possible examples of these additional possible private constant-dollar financial instruments include, but are not limited to:

1. Constant-dollar mutual fund shares, which are undivided interests in the net assets of an open-end investment company that invests predominantly in private constant-dollar financial instruments.
2. Constant-dollar pass-through securities, which are undivided interests in a pool of financial assets that are predominantly private constant-dollar financial instruments.
3. Constant-dollar variable annuities, which are variable annuities for which the investment portfolio for a variable annuity is made up predominantly of private constant-dollar financial instruments.
4. Constant-dollar separate accounts, which are separate accounts of an insurance company that are invested predominantly in a portfolio of private constant-dollar financial instruments.
5. Constant-dollar investment company shares, which are shares in an investment company that invests predominantly in private constant-dollar financial instruments.
6. Constant-dollar closed-end investment company shares, which are shares in a closed-end investment company that invests predominantly in private constant-dollar financial instruments.
7. Constant-dollar trusts, which are interests in trusts that invest predominantly in private constant-dollar financial instruments.
8. Constant-dollar unit investment trusts, which are unit investment trusts that invest predominantly in private constant-dollar financial instruments.
9. Constant-dollar pass-through securities issued by real estate mortgage investment conduits, which are real estate mortgage investment conduits that invest predominantly in private constant-dollar mortgages.
10. Shares in constant-dollar real estate investment trusts, which are real estate investment trusts that invest predominantly in private constant-dollar financial instruments.
11. Constant-dollar swaps, which are swaps where one or more of the payment streams involved in the swap is a payment stream of a private constant-dollar financial instrument.
12. Constant-dollar pensions, which are pensions that pay fixed purchasing power amounts.
13. Constant-dollar pension plans, which are pension plans that invest predominantly in private constant-dollar securities.

14. Constant-dollar defined benefit plans, which are defined benefit pension plans that invest predominantly in private constant-dollar financial instruments.
15. Constant-dollar defined contribution plan, which are defined contribution pension or retirement plans that invest predominantly in private constant-dollar financial instruments.
16. Constant-dollar 401(k) or 403(b) plans, which are 401(k) or 403(b) plans that invest predominantly in private constant-dollar financial instruments.
17. Constant-dollar Independent Retirement Accounts (IRAs), which are IRAs that invest predominantly in private constant-dollar financial instruments.
18. Constant-dollar Keoghs, UGMA, UTMA, Coverdell, Health Savings Accounts, college savings plans, travel expense saving account or other accounts designed or created to cover certain expenses and may include tax incentives such as the ability to invest with before tax dollars, defer taxes, eliminate taxes, etc.
19. A constant-dollar futures contract, which is a futures contract involving one or more private constant-dollar financial instruments.
20. A constant-dollar currency futures contract, which is a futures contract involving two constant-dollar currencies (e.g., constant dollars and constant euros, constant euros and constant pounds, constant dollars and constant pesos, etc.).
21. A constant-dollar forward, which is a forward contract involving one or more private constant-dollar financial instruments.
22. A constant-dollar currency forward, which is a forward contract involving two constant-dollar currencies (e.g., constant dollars and constant euros, constant euros and constant pounds, constant dollars and constant pesos, etc.).
23. A constant-dollar options contract, which is an option contract involving a private constant-dollar financial instrument, a private constant-dollar future, a private constant-dollar forward, or a private constant-dollar swap.
24. A constant-dollar derivative, which is a financial derivatives contract involving a constant-dollar financial instrument or product.

The term "tier" generally refers to a set of financial instruments. A set of financial instruments is one or more financial instruments. Said tier may be fixed (i.e., closed) or ongoing (open-ended).

A fixed, or closed, tier is defined by the fixed set of financial instruments contained in the tier. A fixed tier may be completely fixed or it may allow (or, in some cases, require) some, some part, or all of the instruments in the tier to be replaced by other instruments subject to specified qualifications, requirements, or limitations. A fixed tier may have a finite life time defined by the life of the instruments that it contains and/or the life of an other tier with which the tier is associated.

A possible example of a fixed tier is a set of constant dollar mortgage(s) held by a real estate mortgage investment conduit (REMIC). Said set may include one or more constant dollar mortgages, said constant-dollar mortgage or mortgages being private constant dollar instrument(s) that have been specified in the specifying step in the computer-aided funding process. Said specifying may include step of determining various criteria for the origination or purchase of a constant dollar mortgage, including a real return that is determined using market data that includes a market real interest rate. An embodiment may include a computer control means (FIG. 1B) for a computer-aided method of acquiring (originating and/or purchasing) constant dollar mortgages.

This is a fixed tier as the specified set of constant dollar mortgage(s) will remain unchanged with the exception of substitutions that may be allowed or required by the agreements governing the operation of the REMIC. In a possible example, the agreements governing the REMIC may require the entity that organized the REMIC (possibly an investment banker, a mortgage banker, a commercial bank or other financial institution) to replace a constant dollar mortgage that go into default with one or more constant dollar mortgages that meet certain standards and are not in default. This tier may have a finite life equal to the life of the longest-lived constant-dollar mortgage contained in the tier.

In this possible example, a second tier in a plurality of tiers might be a tier of financial instruments that are the liabilities of the REMIC. This other tier may include constant pass-through securities, constant dollar mortgage-backed securities, an equity or high-yield piece, and/or other financial instruments.

This other tier is associated with the tier comprised of constant dollar mortgage(s) through the vehicle of the REMIC and this other tier, through this association, funds the one tier comprised of constant dollar mortgage(s). This funding of one tier by an other may involve determining, among other things, that: 1) the net sale proceeds of the other tier is sufficient to pay the costs of originating and/or purchasing the constant-dollar mortgages contained in the one tier; 2) the cash flows of the constant-dollar mortgage(s) in the one tier are not less than the cash flows of the financial instruments in the other tier; 3) the real return on the constant-dollar mortgage(s) in the one tier is not less than the real return on the instruments comprising the other tier; 3) the real returns on the instruments comprising the second tier are, when evaluated using market data including a real interest rate, consistent with their required real return given their risk; 4) the splitting, by maturity and/or priority of claims, of the aggregate cash flows of the constant dollar mortgage(s) comprising the one tier among the instruments among the instruments comprising the other tier provides the lowest real cost of funding the one tier by the other; and, 5) the real return on the equity or high-yield piece, if any, is consistent with the required return given its risk.

In a possible embodiment, the computer control means (e.g., the embodiment in FIG. 1B). The computer system can have control means, varying from a menu to other means facilitating human-engaged, interactive, or aided control over the computer system or part thereof, so as to enable and disenable carrying out some or all of the functionality characterized representatively herein. See, e.g., embodiments, etc., discussed herein.) Representatively (and not hereby limiting), the functionality can include managing a computer-aided method for selling the securities making up a tier that is funding an other tier. The computer-aided selling method may use or include a computer-aided method for pricing and/or a computer-aided method for risk management.

The process of specifying the other tier may involve associating cash flow from the one tier comprising constant dollar mortgage(s) with the other tier. This process of associating may include, in the process of specifying the instruments comprising the other tier, the step of computing aggregate cash flows of the one tier comprising constant dollar mortgage(s) to produce homogenous securities in the other tier. A possible example of this process would be to aggregate the cash flows of the one tier comprising constant dollar mortgage(s) and to divide them equally among a number of constant dollar pass-through securities comprising the other tier.

These constant dollar pass-through securities comprising the other tier would be homogeneous because each would represent an undivided interest in the cash flows produced by the constant dollar mortgage(s) comprising the one tier. This homogeneity creates liquidity for the constant dollar pass-through securities, thus enabling the other tier comprised of constant dollar pass-through securities to securitize the one tier comprised on constant dollar mortgage(s).

Because each constant dollar pass-through security represents an undivided interest in the cash flows produced by the constant-dollar mortgage(s) comprising the one tier, each security would be identical in terms of risk and maturity. However, different suppliers of funds (purchasers of the financial instruments comprising the other tier being suppliers of funds) may have different preferences regarding risk and maturity. As a result, it may be possible to reduce the cost of funding the one tier comprised of constant dollar mortgage(s) with the other tier by disaggregating the homogenous securities comprising the other tier, splitting them by claims priorities and/or maturity times.

A possible example of this disaggregating homogeneous securities by splitting would be to specify constant dollar mortgage-backed securities in the other tier. A splitting by maturity times might include specifying a maturity schedule for the other tier comprised of constant dollar mortgage-backed securities. Said specifying may include associating a maturity of the constant dollar mortgage-backed securities comprising the other tier with a maturity of the constant dollar mortgage(s) comprising the one tier. A splitting by priority of claims might create a number of classes of instruments in the other tier. As a possible example: senior constant dollar mortgage-backed securities with first claim on the payments and principal of the constant dollar mortgages comprising the one tier; subordinated constant dollar mortgage-backed securities with second claim on cash flow and principal; junior subordinated constant dollar mortgage-backed securities with third claim on cash flow and principal; and an equity or high-yield piece with last claim on the cash flow and principal of the constant dollar mortgages comprising the one tier.

The funding of the one tier comprised of constant dollar mortgages by the other tier comprised of constant-dollar mortgage-backed securities transforms the liability of a user of funds into an asset of supplier of funds using said tiers. This transformation using said tiers may provide benefits to both suppliers and users of funds by: 1) creating liquidity for suppliers of funds as a result of securitization; 2) providing a variety of real return/risk choices for suppliers of funds; 3) providing a variety of real return/maturity choices for suppliers of funds; and, 4) increasing the availability of funds and reducing their cost for users of funds.

Users of funds who may benefit from the funding created by the association of said tiers may include homeowners, investors in real estate and businesses owning real estate. Suppliers of funds who may benefit from the funding may include, among others: households; investment companies; mutual funds; pension funds; depository institutions; commercial banks; credit unions, etc. To the extent that the suppliers of funds involved in the funding are financial intermediaries (investment companies; mutual funds; pension funds; depository institutions; commercial banks; credit unions, etc.), the result is to involve one or more tiers intermediate that are not within the portion of said tiers that are associated in the funding. For example, the purchase of some of the constant-dollar mortgage-backed securities by a mutual fund that invests in constant-dollar securities involves in the funding a tier of constant-dollar mutual fund shares intermediate that is not within the portion of said tiers that are associated in the funding.

Documentation of the funding may be generated by a computer, or by more than one computer. The computer system of the REMIC, or an other computer system such as the computer system of the entity that formed the REMIC (e.g., an investment banker, a mortgage banker, a commercial bank, a finance company, a credit union, etc.) may generate documentation that may include documentation for one or more private constant-dollar instruments within any of said tiers, documentation regarding the sale, purchase and/or origination of any said instruments, etc.

An other computer system may be involved in generating documentation for one or more private constant-dollar instruments in any of said tiers. A possible example is a REMIC formed by a finance company with the finance company purchasing some or all of the constant-dollar mortgages comprising the one tier from one or more mortgage bankers. The documentation for the constant-dollar mortgages may be generated by the mortgage banker(s) from which the finance company purchases the mortgages. The finance company may engage the services of an investment banker to structure the constant-dollar mortgage-backed securities comprising the other tier, underwrite the securities and market the securities. The investment banker computer may then generate the documentation for the constant-dollar mortgage-backed securities.

An embodiment may include a computer-aided method for servicing any of said constant-dollar instruments in any of said tiers. The computer control means (FIG. 1B) may break down the process of servicing into components, including (but not limited to): 1) monitoring for compliance with terms and covenants of the instrument; 2) managing the payments and accounting for the instrument; and, 3) managing defaults in the event of a default. Said servicing may be performed by one computer or by more than one computer. In the possible example of a REMIC formed by a finance company, the servicing of a constant-dollar mortgage in the one tier may be performed by the computer of a mortgage banker, the computer of the finance company, or an other computer or computers. The servicing of the constant-dollar mortgage-backed securities in the other tier may be performed by a servicing computer operated by a commercial bank or by an other computer or computers.

It may be that all of the constant-dollar mortgages comprising the one tier are in one currency (e.g., U.S. dollars) and that the constant-dollar mortgage-backed securities comprising the other tier are in the same currency, determining a funding in only one currency.

It may be that one or more of the constant-dollar mortgages comprising the one tier are in a currency or currencies different from the currency or currencies of the constant-dollar mortgage-backed securities comprising the other tier. As a possible example, the constant-dollar mortgages comprising the one tier may be in Mexican pesos (constant-peso mortgages) or in a variety of developing country currencies and the constant-dollar mortgage-backed securities may be in U.S. dollars (or euros or some combination of developed country currencies). If more than one currency is involved in the funding, the funding may include a step of determining a value of one or more tiers responsive to currency.

An embodiment may include a computer control means (FIG. 1B) for a computer-aided risk management system that may be used to assess and manage the risks that may arise as a result of funding one tier with another tier. In the process of assessing and managing risk, this computer-aided risk management system may utilize the computer-aided method for pricing a constant-dollar instrument. It may assess interest rate risk by determining the possible variation in real interest rates and determining the impact of that variation on the value of the instruments composing each of the tiers.

In the event that the currencies underlying the instruments composing one tier differ from the currencies underlying the instruments composing an other tier, the computer-aided risk management system may assess the real exchange rate risk by determining the possible variation in real exchange rates and determining the impact of that variation on the value of the instruments composing each of the tiers. It may also determine the risk and return of various strategies for managing the possible real currency risk using inflation-immunized currency futures, forwards, options and/or swaps.

The computer-aided method for managing risk may include the capability to assess and manage the default risk of the instruments composing one or more of the tiers. The computer-aided method for managing risk may include, or work with, a computer-aided method for managing defaults.

An embodiment can include tiers that are ongoing, or open-ended rather than fixed. In an ongoing, or open-ended, tier instruments may be added or removed over time. The size of the tier (as measured by the number of instruments, the principal amount of the instruments, etc.) may grow or shrink over time. There may or may not be restrictions, limitations, requirements, regulations, etc. which may limit, affect or otherwise determine the instruments which may be added or removed from an ongoing tier.

As a possible example, consider an ongoing tier of instruments that are assets of an insurance company. Regulators of the insurance company may put forth regulations stating that any instrument added to the tier must be rated as "investment grade" with regard to credit risk. The insurance company may have a set of requirements, guidelines, etc. that further limit or determine whether or not an instrument may be added to the tier (e.g., loan-to-value and debt coverage standards for commercial real estate loans).

In addition to an ongoing tier of instruments that are assets of the insurance company, the insurance might also have an ongoing tier of private constant-dollar financial instruments that are assets of a separate account of the insurance company. Said tier may, depending on the investment guidelines set by the insurance company, be comprised of more than one type of private constant-dollar financial instrument (e.g., constant-dollar corporate bonds, constant-dollar mortgages, constant-dollar mortgage-backed securities, constant-dollar asset-backed securities, constant-dollar preferred stock, etc.).

In this possible example, undivided interests in said separate account may comprise a tier intermediate within the portion of tiers that are associated in the funding. The tier of private constant-dollar instruments that are assets of the separate account may be funded by associating said tier with a tier of constant-dollar insurance and annuity instruments sold by the insurance company, with tier of undivided interests in said separate account intermediate within the portion of tiers associated in the funding.

In funding an ongoing tier of private constant-dollar financial instruments by associating it with an other ongoing tier comprised of constant-dollar insurance and annuity instruments, the computer of the insurance company is transforming the liability of a user of funds into an asset of a supplier of funds using said tiers.

An embodiment may include a computer control means (FIG. 1B) for a computer-aided method for pricing instruments, servicing instruments, risk management, acquiring instruments, and/or selling instruments.

As another possible example of funding involving the association of ongoing tiers, consider a finance company. The one ongoing tier, comprised of instruments that are assets of the finance company, may (depending on the investment guidelines of the finance company) include, but not be limited to, some combination of:

1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, especially a constant-dollar reverse mortgage which enables a consumer to tap the equity in their residence by receiving payments of constant purchasing power amounts, with the resulting constant-dollar loan being repaid through the sale of the residence at some defined point.
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds.
25. Constant-dollar fully-amortizing bonds.
26. Constant-dollar private placement bonds.
27. Constant-dollar public issue bonds.
28. Constant-dollar medium-term notes, which are constant-dollar bonds (that can be of any maturity, in spite of the name) that are issued on a continuing basis over time rather than through the batch process of traditional underwriting.
29. Constant-dollar debentures.
30. Constant-dollar subordinated debentures.
31. Constant-dollar capital notes.
32. Constant-dollar mortgage bonds.
33. Constant-dollar equipment trust certificates.
34. Constant-dollar asset-backed securities.
35. Constant-dollar mortgage-backed securities.
36. Constant-dollar preferred stock.
37. Constant-dollar fully-amortizing preferred stock.
38. Constant-dollar limited partnership units.
39. Constant-dollar preferred-return LLC (Limited Liability Company) units.

40. Constant-dollar income bonds, where the issuing organization makes the promised real (purchasing power) payment only if it has income sufficient to make the payment. Payments that are not paid may cumulate with or without compounding (payment of interest on interest).

An other ongoing tier, comprised of instruments that are liabilities of the finance company, is associated with the one ongoing tier in the funding of the one ongoing tier by the other ongoing tier. The other tier may include, but not be limited to, some combination of:

1. Constant-dollar debentures.
2. Constant-dollar subordinated debentures.
3. Constant-dollar capital notes.
4. Constant-dollar asset-backed securities.
5. Constant-dollar income bonds.
6. Constant-dollar preferred stock.

In the process of funding the one ongoing tier with the other ongoing tier, the finance company may: 1) sell constant-dollar instruments comprising the other tier and then purchase and/or originate constant-dollar instruments comprising the one tier; 2) purchase and/or originate constant-dollar instruments comprising the one tier and then sell constant-dollar instruments comprising the other tier; 3) simultaneously sell constant-dollar instruments comprising the other tier and purchase and/or originate constant-dollar instruments comprising the one tier; or, 4) practice some combination of the preceding.

An embodiment may include a computer control means (FIG. 1B) for a computer-aided method for pricing instruments in one or both ongoing tiers, servicing instruments in one or both ongoing tiers, managing risk, acquiring instruments in one or both ongoing tiers, and/or selling instruments in one or both ongoing tiers.

In funding an ongoing tier of private constant-dollar financial instruments by associating it with an other ongoing tier comprised of liabilities of the finance company, the computer-aided method of funding is transforming the liability of a user of funds into an asset of a supplier of funds using said tiers.

In an embodiment may include a computer-aided method for pricing a private constant-dollar instrument, the initial choices in the computer control means (FIG. 1B) may be (182): 1) given a real rate of return, determine price; and, 2) given a price, determine a real rate of return. If the choice is to determine a price given a real rate of return, the next step may to input a real interest return, including a specification of the period of the return (e.g., the real return per year) and the number of times that the return is compounded during the period (e.g., compounded once per year), the terms and agreements of the instrument, and the servicing record (if any) of the instrument. The terms may include the frequency of payments and the frequency of adjustment for inflation. If the payment period is as long or longer than the adjustment period (e.g. monthly payments and monthly adjustments for inflation, semi-annual payments and monthly adjustments for inflation, semi-annual payments and semi-annual adjustments for inflation, etc.), one pricing process may be chosen. A different process may be chosen if the payment period is shorter than the adjustment period (e.g., monthly payments and annual adjustment for inflation).

If the payment period is as long or longer than the adjustment period, the process may pricing process may begin by entering data from the financial instrument and the servicing of the financial instrument. The system may then determine the number, amount and timing of the remaining constant dollar payments. The system may then convert the constant-dollar amounts to amounts based on the purchasing power of the dollar today. The system may convert the input real rate of return into an equivalent real rate for the payment period with compounding frequency of once per payment period (the input real rate may be for a time period different than the payment period and/or it may have a compounding period different from the payment period). The system may discount the scheduled future constant dollar amounts (measured in the purchasing power of the dollar today) at the real return per payment period (compounded once per payment period) to determine the price (the present value of the scheduled future constant dollar amounts—measured in the purchasing power of today's dollar—discounted at the input real rate) of the instrument in today's dollars.

Consider an instrument that has equal real (constant-dollar) payments every six months and is fully amortizing over 30 years. Ten of the scheduled sixty equal real payments have been made and the remaining fifty will be paid every six months. If the adjustment period equals the payment period (six months), the servicing data may include both the amount of the most recent payment in nominal dollars and the amount of the next scheduled payment in nominal dollars. If the adjustment period is shorter than the payment period (e.g., adjustment for inflation every month vs. a payment every six months), the servicing data may not include the nominal dollar amount of the next scheduled payment, although it will include the nominal dollar amounts of all previous payments, including the latest payment.

The system may use the nominal dollar amount of the latest payment and the current inflation rate to determine the amount of the equal real payments measured in the purchasing power of the dollar today. It may use the nominal dollar amount of the next scheduled payment (if available) and the current inflation rate to determine the amount of the equal real payments measured in the purchasing power of the dollar today. If inf is the current inflation rate per payment period (not per year unless the payment period is one year), compounded once per period, then the equal real (constant-dollar) payment amount expressed in the purchasing power of the dollar today may be calculated by multiplying the nominal dollar amount of the latest payment by $(1+inf)^{(n/N)}$ where N is the number of days in the current payment period and n is the number of days of the current payment period that have elapsed to date. If the amount of the next scheduled payment in nominal dollars is known, the equal real (constant-dollar) payment amount expressed in the purchasing power of the dollar today may be calculated by dividing the nominal dollar amount of the next payment by $[(1+inf)^{(m/N)}]$ where N is the number of days in the current payment period and m is the remaining number of days in the current payment period.

The system may then convert the input real rate of return into an equivalent real rate for the payment period with compounding frequency of once per payment period. For example, suppose that the input real rate of return was input in the units of a bond rate of interest (annual rate with semi-annual compounding). In this case, the system would determine the real rate of return per six-month payment period (compounding every six months) by dividing the input real return by 2. If the real rate of return was input as an effective annual rate of interest (annual rate with annual compounding), the system would determine the real rate per six-month period (with six-month compounding) $r_p$ by adding one to the input real rate $r_i$, raising the quantity to the one-half power, and subtracting one: $r_p = (1+r_i)^{(1/2)} - 1$.

The system may then determine the price (the present value of the scheduled future constant dollar amounts—measured in the purchasing power of today's dollar—discounted at the input real rate) of the instrument in today's dollars by: 1) finding the present value of an ordinary annuity with 50 equal constant payments (the constant-dollar payment amount in the purchasing power of today's dollar) at an interest rate or $r_p$ per period; and, 2) adjusting for the amount of the current payment period that has elapsed to date. The adjustment for the amount of the payment period that has elapsed may be made by multiplying the present value of the annuity by $(1+r_p)^{\wedge}(n/N)$ where N is the number of days in the current payment period and n is the number of days of the current payment period that have elapsed to date. The system may then output the price as the current value of the instrument given the input real rate of return.

If the payment period is shorter than the adjustment period for inflation (e.g., a constant-dollar mortgage with monthly payments and annual adjustments for inflation), the process may determine an equivalent, end of adjustment period, constant-dollar payment amount equal to the future value of the nominal payment amounts specified during the adjustment period (note that the process for converting a constant-dollar instrument into an equivalent nominal-dollar instrument may calculate an equivalent, end-of-adjustment period constant-dollar amount as a part of the conversion process if the payment period is shorter than the adjustment period).

The pricing process may begin by entering data from the financial instrument and the servicing of the financial instrument. The system may then determine the number, amount and timing of the remaining equivalent, end-of-adjustment period, constant-dollar payments. The system may then convert the equivalent, end-of-adjustment period, constant-dollar amounts to amounts based on the purchasing power of the dollar today. The system may convert the input real rate of return into an equivalent real rate for the adjustment period with a compounding frequency of once per adjustment period (the input real rate may be for a time period different than the adjustment period and/or it may have a compounding period different from the adjustment period). The system may discount the scheduled equivalent, end-of-adjustment period, future constant-dollar amounts (measured in the purchasing power of the dollar today) at the real return per adjustment period (compounded once per adjustment period) to determine the price (the present value of the scheduled future constant dollar amounts—measured in the purchasing power of today's dollar—discounted at the input real rate) of the instrument in today's dollars before adjustment for the value of the payments (if any) that have already been made in the current adjustment period. The price may then be calculated as the present value of the equivalent, end-of-adjustment period, constant-dollar payment amounts, minus the value today (adjusted for the time value of impact of the real rate of return and the current rate of inflation) of the payments that have already been made in the current adjustment period.

Consider a 30 year, fully-amortizing constant-dollar mortgage with equal real monthly payments. The mortgage is in its third year, so two of the 30 equivalent, end-of-adjustment period (one year), constant-dollar payments have been received and 28 of the equivalent, end-of-adjustment period (one year), constant-dollar payments are scheduled to be received in the future (although some portion of the third year equivalent, end-of-adjustment period, constant-dollar payment may have been received if one or more of the monthly payments for the current adjustment period have been make. The servicing data will provide the current nominal dollar amount (for the duration of the adjustment period) of the monthly payments. The system may convert the input real rate of return into an equivalent real rate for the adjustment period with compounding frequency of once per adjustment period. For example, suppose that the input real rate of return was input in the units of a mortgage rate of interest (annual rate with monthly compounding). In this case, the system would determine the real rate of return per adjustment period (annual compounding), $r_p$, by dividing the input real rate of return, $r_i$, by 12, adding one and raising the quantity to the twelfth power, and subtracting one: $r_p=(1+r_i/12)^{\wedge}(12)-1$.

The system may then use the current inflation rate for the adjustment period (compounded once per adjustment period), inf, the real rate of return per adjustment period, $r_p$, and the nominal dollar amount of the current monthly payment, PMT, to calculate the equivalent, end-of-adjustment period, constant-dollar payment (expressed in dollars with the purchasing power of a dollar at the end of the current payment period). The equivalent, end-of-adjustment period, constant-dollar payment (in the dollars of the end of the current adjustment period) may be calculated as the future value (at the end of the adjustment period) of the 12 equal monthly nominal dollar payments for the current period. This a future value of annuity calculated at the nominal interest rate corresponding to rp and inf, which equals:

$$\text{PMT}^*\{[(1+r_p)^*(1+\text{inf})]-1\}/\{[(1+r_p)^*(1+\text{inf})]^{\wedge}(1/12)-1\}$$

The system may convert the resulting equivalent, end-of-adjustment period, constant-dollar amount—which is in terms of the purchasing power of an end-of-adjustment period dollar—to constant dollars measured in terms of the purchasing power of a dollar today by dividing by the quantity $[(1+\text{inf})^{\wedge}(m/N)]$ where N is the number of days in the current adjustment period and m is the remaining number of days in the current adjustment period.

The system may then determine the price of the instrument in today's dollars by: 1) finding the present value of an ordinary annuity with 28 equal constant payments (the number of remaining equivalent, end-of-adjustment period, constant-dollar payments measured in the purchasing power of today's dollar) at an interest rate or $r_p$ per period; 2) adjusting the present value of the annuity for the amount of the current adjustment period that has elapsed to date; and, 3) reducing the present value by value today of the nominal dollar monthly payments (if any) that have been already made in the current adjustment period.

The adjustment for the amount of the payment period that has elapsed may be made by multiplying the present value of the annuity by $(1+r_p)^{\wedge}(n/N)$ where N is the number of days in the current adjustment period and n is the number of days of the current adjustment period that have elapsed to date. If monthly payments have already been made during the current adjustment period, they must be adjusted to their value today (using the nominal interest rate equivalent to the real interest rate and the current inflation rate), and that value today subtracted from the adjusted present value of the annuity to get the price. A monthly payment (in nominal dollars) that has already been made in the current adjustment period is adjusted to its value today by multiplying PMT by $\{[(1+r_p)^*(1+\text{inf})]^{\wedge}(p/N)\}$, where p is the number of days since the payment was made and N is the number of days in the current adjustment period. The system may then output the price as the current value of the instrument given the input real rate of return.

If the choice for the pricing process is to determine the real rate of return given a price, the computer-aided method may combine an iterative process with the process for determining a price given a real rate of return in order to determine the real rate of return that makes the calculated value (the present value of future constant-dollar cash flows) equal to the input price. An initial real rate of return may be entered (or generated by the system) and a price calculated for that real rate of return. If the calculated price is greater than the input price, the iterative process may generate a higher real rate of return and calculate a price. If the new calculated price is lower than the input price, the iterative process may generate a real rate of return that is between the two initial real rates and calculate a price, with the iterative process continuing until it converges to a real rate of return that makes the calculated price equal to (within a specified margin of error) equal to the input price. The system may then output that real rate of return as the real rate of return on the instrument given the input price.

In one embodiment, the computer-aided method for managing risk may include, or work together with, a computer-aided system for the determination of inflation-immunized exchange rates and various possible applications thereof. The computer control means in FIG. 1B may interconnect with, or work with the computer system control devise of FIG. 4 if the user chooses the risk management option in the main menu and then the currency risk option in the risk management subsystem. The computer-aided system for the determination of inflation-immunized exchange rates may be used in conjunction with the determination of real exchange rate risk and/or in the management of real exchange rate risk.

The computer support for the computer-aided system for inflation-immunized exchange rates may be implemented by one computer system or it may be implemented by multiple computer systems that may be connected or networked together in an ongoing manner, intermittently, or one time. The computer system (FIG. 5) may include a computer, an input device such as a keyboard, a storage device, a disk including software and a computer program, and an output device such as a screen and/or a printer. The computer system (FIG. 5) may include a computer control system (FIG. 4) or it may interact with the computer control system through an input means and/or a connection such as the internet, an intranet and/or other computer systems. The computer system may also include connection(s) to the Internet, an intranet, and/or other computer systems.

In one embodiment, said computer support may include a device (FIG. 4) or programmed system (one, the other, or both collectively being a means for) controlling a computer system that may determine and/or apply inflation-immunized exchange rates. The means for controlling the computer system may include a menu displayed on a computer screen. The menu may offer choices, including: entering the currencies for which inflation-immunized exchange rates are determined; entering which of the currencies is to be the numerator of the inflation-immunized exchange rates (with the other currencies then being denominator currencies); entering an index which is used to immunize the numerator currency; entering an index (indices) which is use to immunize the numerator currency (currencies); entering a base time period to which the purchasing power of the currencies are to be set; entering spot (not inflation-immunized) exchange rate data; determining the inflation-immunized exchange rates; and outputting the inflation adjusted exchange rates.

The data for the spot exchange (and/or the data for indices used to immunize the currencies) may be entered electronically through a connection to one or more other computer systems (e.g., a reporting computer system and/or a trading computer system). An electronic connection may enable the computer system to determine (and output) the inflation-immunized exchange rates in real time. The indices that serve as the basis for immunizing a currency may be any price index or any other index or combination of indices from an economy or economy that uses that currency as a medium of exchange. For economies that issue inflation-linked (also known as constant-dollar or constant-currency) securities, the system may choose to use that price index (the Consumer Price Index for all Urban consumers, not seasonally adjusted, or CPI-U, in the case of the U.S.) that is used to adjust Treasury Inflation-Protection Securities (TIPS) for inflation. This may increase the value of the hedges (i.e., futures contracts, forward contracts, option contracts, etc.) that may be created using the inflation-immunized currency exchange rates.

The computer-aided system may be implemented by one computer system (FIG. 5) or more than one computer system (FIG. 5A). If implemented by more than one computer system, the computer-aided system may include (but is not limited to): one or more reporting computer systems; one or more trading computer systems; one or more broker computer systems; one or more dealer computer systems; one or more investment banking computer systems; one or more commercial bank computer systems; one or more investment management computer systems; and one or more government computer systems. The computer systems may be connected by one or more systems (e.g., the Internet, Intranet(s), hardwire, etc.) for connecting computer systems. The computer systems may be connected intermittently, continuously or on a one-time basis.

Any computer system that may be involved, regardless of whether one or more is involved, may be in any form or combination, including, but not limited to: a mainframe computer and terminal(s) configuration, a client/server computer configuration, a configuration comprised of a personal computer, a desk-top computer, a lap-top computer, a pocket computer, a palm computer, a personal digital assistant, a digital cell phone or other portable device, but other ways of thinking, embodiments can extend to comprising a Wi-Fi node, an embedded processor, a car or other vehicle computer, a light-wave computer, a biological or hybrid computer, a quantum computer, etc.

If more than one computer system is involved, the computers may be connected, or not connected, in any pattern. The connections need not be continuously maintained; they may be intermittent, one-time or ongoing. One or more of these connections may involve the use of the Internet, an intranet, e-mail, instant messaging, text messaging, voice mail, a local area network (LAN), a wide area network (WAN), a twisted pair of copper wires, a coaxial cable, a cellular network, Wi-Fi, wide area Wi-Fi, a Wi-Fi network, a light-wave transmission, infrared, and/or a wireless connection. One of more of the connections may involve one-way communication only. One or more may involve two-way communication. Real time communications are another possibility.

More than one of any variety of computer system may be involved in the computer-aided system for inflation-immunized exchange rates. For example, there may be more than one reporting computer system, more than one trading computer system, etc.

One (of many distinct) embodiment(s) is a computer-aided system for inflation-immunized exchange rates. The use of inflation-immunized exchange rates may remove risk from the financing process, create new investment opportunities, and improve risk management. Inflation-immunized exchange rates may be especially valuable when used in conjunction with constant-dollar financial instruments. When used in conjunction with constant-dollar financial instruments, inflation-immunized exchange rates may be used (e.g., in futures contracts, forward contracts, swaps contracts and/or option contracts) to reduce currency risk and enhance international investment opportunities. This in turn may lead to an increase in global prosperity and a reduction in present disparities of economic incomes and opportunities.

Constant-dollar financial instruments are financial instruments whose terms (e.g., payment amounts, rate of return or interest rate, schedule of remaining principal balances, etc.) can be specified in units of constant purchasing power, such as dollars that have been adjusted using an index such as a price index (for example, one of the variations of the Consumer Price Index) so as to maintain constant purchasing power (i.e., they are inflation-immunized financial instruments). However, the term "constant-dollar financial instrument" can apply to financial instruments whose terms are specified in units that are held constant in purchasing power and/or are adjusted through the application of any specified index.

The units that are held constant in purchasing power and/or are adjusted by an index may be any currency (not just dollars) and they may be held constant and/or adjusted by any desired price index or other economic index. In the event of private constant-dollar instruments that are derived from one or more other private constant-dollar instruments, there may be more than one currency and more than one index involved. The currency (or currencies) may be any national currency (e.g., U.S. dollars, Canadian dollars, Australian dollars, Mexican pesos, British pounds, Swiss francs, euros, yen, rubles, zlotys, Danish kroner, etc.) or any other variety of currency including private and/or local currencies. Possible varieties of price or other indexes may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index, an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.)

Constant-dollar financial instruments may be converted into equivalent nominal-dollar financial instruments because payments presently are made in nominal dollars and because accounting, both for purposes of reporting and for calculating taxes, is presently carried out in terms of nominal dollars. Two processes have been invented for performing said conversion, both by an inventor herein. The first is disclosed in U.S. Pat. No. 5,237,500 and the second is disclosed in U.S. patent application Ser. No. 09/283,102, U.S. Pat. No. 6,760,710 B1, both incorporated by reference herein. The U.S. patent application titled "MULTIPLE COMPUTER SYSTEM SUPPORTING A PRIVATE CONSTANT-DOLLAR FINANCIAL PRODUCT" which was filed on Jul. 6, 2004 as a continuation in part of U.S. Pat. No. 6,760,710 B1 is also incorporated by reference herein. Further, U.S. patent application Ser. No. 10/957,399 titled "A COMPUTER-AIDED PROCESS OF FUNDING, INCLUDING A PRIVATE CONSTANT-DOLLAR INSTRUMENT" which was filed Oct. 1, 2004 is also incorporated by reference.

Private constant-dollar financial instruments can be financing instruments issued by (i.e., they are liabilities of or interests in) funds users who are subject to default risk, including (but not limited to): individuals, households, for-profit businesses, corporations, partnerships, limited partnerships, sole proprietorships, financial intermediaries, depository institutions, banks, credit unions, thrifts, savings and loans, savings banks, insurance companies, investment companies, real estate investment trusts (REITS), limited-liability companies, not-for-profit businesses, nongovernmental organizations, trusts, real estate mortgage investment conduits (REMICS), other pass-through entities, municipal governments (state and local governments), agencies of municipal governments, school districts, water districts, transportation districts, other special purpose districts, and federally sponsored enterprises (e.g., Federal National Mortgage Association, Federal Home Loan Mortgage Corporation, etc.). The issuers of private constant-dollar financial instruments may be domiciled in the U.S. or in other countries. They may be payable in the currency of the country in which they are issued or in any other currency.

Unlike the federal government, the issuers of private constant-dollar financial instruments do not have the power to print money. Therefore, unlike securities issued by the national or federal government, private constant-dollar financial instruments are subject to default risk and this default risk may be reduced by matching the payments promised by the instruments to the expected future revenues of the issuer. The fixed real (purchasing power) payments of the private constant-dollar financial instruments can be tailored to produce a reasonable, or even the best possible, match between promised real payment amounts and the expected future real revenues of the issuer, thus reducing the default risk relative to alternative instruments which do not have fixed real payments and cannot, therefore, be tailored to produce a reasonable, or even the best possible, match between promised payments and expected future real revenues.

Note that the use of the U.S. government is illustrative, as the concept applies equally well to other governments that have the power to print money.

This context for the term "constant-dollar financial instrument" is applicable herein, and private constant-dollar financial instruments may be comprised of, utilize and/or be derived from one or more other private constant-dollar financial instruments, where the term "constant-dollar financial instrument" applies to instruments whose units that are held constant may be any currency adjusted by any desired price index or other economic index.

Private constant-dollar financial instruments may or may not be "private" in the sense that the data regarding the instrument or the issuer is private. Indeed, in the case of a public issue of private constant-dollar financial instruments, federal and state securities laws mandate extensive public disclosure of data regarding both the securities and the issuer of the securities.

Private constant-dollar financial instruments that hold purchasing power constant (by adjusting the nominal currency amounts by an agreed upon price index) are distinguished from other private financial instruments (i.e., financial instruments that are not constant-dollar instruments) by their virtual elimination of inflation risk and their ability to reduce default risk. They may reduce interest rate risk because real interest rates are less volatile than nominal interest rates.

The use of constant-dollar financial instruments (both private and issuances by national governments) may eliminate a portion of the currency risk in international financing by eliminating the impact of differential inflation rates on changes in the exchange rate—a major factor in long-term exchange rate risk. The inflation-immunized exchange rates produced by the computer-aided method will enable market participants to efficiently manage the remaining currency risk—including the ability to reduce the remaining currency risk through the use of hedging instruments (e.g., futures contracts, forward contracts, swaps contracts and option contracts) that are created using the inflation-immunized exchange rates.

The inflation-immunized exchange rates of the present embodiments may utilize (see FIG. 6) infill indices that the gaps between the observation times (typically one month and sometimes as much as one quarter) for each index be filled in so as to provide a data frequency that is consistent with the frequency with which the spot exchange rates are observed, thus creating "infill indices." For inflation-immunized exchange rates that are used to create an index that is then used as the basis for a hedging instrument (e.g., futures contracts, forward contracts, swaps contracts, option contracts, etc.), the utilized data frequency may be approximately continuous.

In the case of an inflation-immunized exchange rate index that is used to define hedging instruments, the "data infill" for the price (or other) index used to adjust a currency for inflation may be based on past observations of the price (or other) index. For example, if the index is a monthly index (such as the CPI-U), the process of filling in the data between the monthly observations may be carried out by developing a process to predict the next monthly value for the index given past monthly data. The prediction for the next monthly value may then be used to "fill in" the index values for the times between the value corresponding to the latest monthly observation and the predicted next monthly value.

Any agreed-upon process may be used to predict the next monthly value. A simple, naïve process would be to predict the next monthly value to be equal to the latest available monthly observed value. Given that price levels usually increase over time, this naïve process may not be optimal. Another possible process for prediction may be to use a trend line based on the past rate of increase (e.g., the rate of increase over the last month, over the last quarter, over the last six months, over the last year, etc.). Still another possible process for prediction is to use a weighted average of recent monthly rates of change, possibly estimated using past data sets. Yet another possible process for prediction is to use a time series estimation process such as Box-Jenkins, exponential smoothing or a cycles-based process.

Given the predicted next monthly value, the data between the value corresponding to the latest monthly observed value and the predicted next monthly value may be filled in using a linear process, an exponential process, or any other desired process. For an example of a linear process for infill, assume that $CPI_A$ is the value corresponding to latest monthly observed value for the CPI, that $CPI_p$ is the projected value for the next monthly CPI, that $t_m$ is the number of days in the month, that t is the number of days since the latest observed value for the CPI, and that $CPI_t$ is the infill value at time t. Then:

$$CPI_t = CPI_A + t^*(CPI_p - CPI_A)/t_m$$

An example of an exponential process for infill is (using the same notation):

$$CPI_t = CPI_A + [(CPI_p/CPI_A)^{(t/t_m)} - 1]^*CPI_A$$

Regardless of the process used for infill, t may be in fractional days or it may be in whole days. If whole days are chosen, the infill value may be assumed to be unchanged throughout the day.

At the time that the next observed value of the index is received, that actual value may or may not be used to replace the value that was previously predicted. If the previously predicted value is not replaced by the actual value of the index for that time period when the actual value becomes available, then the value corresponding to the latest observed value will be the value that was predicted for that period rather than the actual value of the index for that period (or, in terms of the above notation, $CPI_A$ will be the value that was predicted for that month, rather than the actual value for that month). However, the actual values of the index may be used to predict the value for the coming month, thus minimizing the forecast error.

The infill series will fluctuate around the actual series but the differences will likely be minimal (likely well within the measurement error of the actual series). In addition, choosing not to replace predicted values with actual values will eliminate any discontinuities in the infill series that might result from replacement of predicted values by actual values without introducing a need to revise previously established infill values.

If the infill index replaces predicted values with actual values, then fluctuations of the infill index around the actual index will be eliminated. However, this choice will introduce discontinuities into the infill index unless the infill values are revised following the insertion of the actual value. For purposes of determining inflation-immunized exchange rates that are used in—contracts), these discontinuities or revisions may be less desirable than the minor fluctuations around the actual index that are created by retaining the predicted values in the infill index. Therefore, the users of the hedging instruments may prefer the retention of the predicted values in the infill index. However, the system of some of the embodiments offers them their choice of methodology for creating the infill index.

After the infill indices are determined, the system (FIG. 6) will update the infill indices as the underlying price indices are updated and output the updated infill price indices.

After the numerator currency and the base date for inflation immunization are chosen and the spot currency exchange rates have been input, the system (FIG. 6) will determine the inflation-immunized exchange rates using the specified infill indices and output the inflation-immunized exchange rates. Spot exchange rates will be input into the system (FIG. 6) on a real time basis and the system will: 1) determine the inflation-immunized exchange rates on a real time basis; and, 2) output the inflation-immunized exchange rates on a real time basis. For example, suppose that the spot exchange rate is $1.60 (U.S.) for 1 British pound and that the base period for inflation-immunization is Jan. 1, 2000. The system will use the infill index for the U.S. dollar to transform $1.60 today into Jan. 1, 2000 dollars by multiplying $1.60 by the infill index value for Jan. 1, 2000 and dividing by the current value of the infill index. Say that the result is $1.45 in Jan. 1, 2000 dollars. The system will use the infill index for the British pound to transform 1 pound today into Jan. 1, 2000 pounds by multiplying 1 pound by the infill index value for Jan. 1, 2000 and dividing by the current value of the infill index. Say that the result is 90 new pence in Jan. 1, 2000 pounds. The system will then divide $1.45 by 0.90 to get (and output) an inflation-immunized exchange rate of $1.61 in Jan. 1, 2000 dollars for 1 Jan. 1, 2000 pound.

The result will be an inflation-immunized exchange rate index that is produced and available on a real time basis, thus creating an index that is a suitable basis for defining, producing and pricing inflation-immunized hedge instruments (e.g., futures contracts, forward contracts, swap contracts and options contracts).

The computer-assisted system of the some embodiments can include the use of the inflation-immunized exchange rate indices produced (in real time) by the system (and the associated infill price indices) in: 1) defining inflation-immunized hedge instruments (e.g., futures contracts, forward contracts, swap contracts and option contracts); 2) producing the instruments; 3) trading the instruments; 4) pricing the instruments; 5) calculating margin requirements (if applicable); and, 6) settling the contracts.

Consider the definition, creation, trading, pricing and settlement of an inflation-immunized currency futures contract using an inflation-immunized exchange rate index (and associated infill price indices) produced in real time by the system of the some embodiments.

Suppose that the currencies are the U.S. dollar and the British pound. The underlying indices chosen are the CPI-U for the U.S. dollar (used to adjust TIPS for inflation) and the price index that is used to adjust inflation-linked gilts. It will be specified whether the contract will be a cash settlement contract or whether delivery will be required. For each price index, a process is specified for creating the associated infill index. A source of spot exchange rate data that is available on a real-time basis is specified (including a choice of using bid or offer rates). A numerator currency is specified—assume that it is the U.S. dollar, thus making the pound the denominator currency. A base period (say Jan. 1, 2000) is chosen for inflation immunization. A contract size is chosen (say 10,000 Jan. 1, 2000 pounds) and contract expiration dates are selected. Contract dates may involve maturities that are significantly longer than the maturities of most futures contracts. Expiration dates of 10 years, 15 years—even 20 years or 30 years—would be useful for hedging international investments in constant-dollar securities (and other investments that can be expected to produce real cash flows, such as commercial real estate and common stocks). A margin requirement is established (say 3% of the value of the contract in current dollars). The value of the contract in current dollars can be found by using the infill index associated with the CPI-U to adjust the closing price of the contract from Jan. 1, 2000 dollars to current dollars.

The system will mark all accounts to market every trading day at the closing price. The system will multiply the closing price in Jan. 1, 2000 dollars by the current value of the infill index and divide the result by the Jan. 1, 2000 value of the infill index and then multiply the result by 3% to calculate the margin requirement for a contract in current dollars. The system will then determine (and output, if required) whether or not a margin call will be made, and if so, the amount of the margin call. The system will also determine (and output, if relevant) the amount of surplus funds (if any) in the margin account.

When an open position is closed, the system will calculate the gain or loss in Jan. 1, 2000 dollars, convert the gain or loss to current dollars using the infill index, and determine the amount of dollars that is to be paid to (or is due from) the investor. For contracts that remain open until their expiration date, the system will determine (using the infill indices and the closing inflation-immunized currency index value) the amount of the cash settlement in current dollars (for cash settlement contracts) or the number of current pounds to be delivered for the number of current dollars (for contracts that require delivery).

The system may be used to define, create, trade, price and settle options on inflation-immunized currencies. The option contracts may be defined in terms of the purchase of a specified amount of one inflation-immunized currency (say, 10,000 Jan. 1, 2000 British pounds) for a strike price specified in another inflation-immunized currency (say 16,000 in Jan. 1, 2000 U.S. dollars) at a specified exercise date (say 10 years in the future) or they may be defined in terms of an option to buy an inflation-immunized currency futures contract at a strike price specified in terms of inflation-immunized currency exchange rate with an exercise at or close to the expiration day of the futures contract.

Similarly, the system may be used to define, create, trade, price and settle inflation-immunized exchange-rate currency forward and swaps contracts. The markets for forward and swaps contracts are an over-the-counter dealer market with most of dealers being large commercial banks and/or investment banks. The contracts are customized to meet the needs of the customers and the dealers may hedge their net exposure by going long in constant-dollar instruments denominated in one currency while simultaneously going short constant-dollar instruments denominated in the other currency. Or they may hedge their net exposure using inflation-immunized currency futures. Regardless of their hedging procedure, the dealers will use the system to continuously price their swaps, forwards and hedges so as to be able to adjust their hedge position in a manner that minimizes their risk.

FIG. 7 illustrates an embodiment in which an inflation-immunized derivative is implemented using a computer-aided method. The inflation-immunized derivative may be used to manage the real price risk of a commodity, good or service, or a financial product. If the financial product is a constant-dollar financial product, the inflation-immunized derivative may be referred to as a constant-dollar derivative. The inflation-immunized derivative may be an inflation-immunized future, and inflation-immunized forward, an inflation-immunized option, an inflation-immunized swap and/or any combination of the preceding.

A current dollar price for the commodity, good, service or financial product is entered into the system 702. A price index is chosen 702 together with a process for creating an infill index 704. Price index data is entered 706 and used to determine the infill index 708. The terms of an inflation-immunized derivative are entered 710 and the system produces nominal dollar data corresponding to the terms of the inflation-immunized derivative 712 and outputs the data 714.

FIG. 1 illustrates an embodiment directed to a single computer system comprised of a computer with control means 14, an input means such as a keyboard 12, a storage means such as a disk drive 10, and an output means such as a printer 16.

FIG. 1A expands the system 1 to include the possibility of more than one computer. The possible computers comprising the system 1 include, but are not limited to, any computer or combination of computers including: a financial intermediary computer 100; a depository institution computer 102; a commercial bank computer 104; a credit union computer 106; an insurance company computer 108; a pension fund computer 110; a finance company computer 112; a leasing company computer 114; an investment company computer 116; a mutual fund computer 118; a real estate investment trust computer 120; a special purpose entity computer 122; a real estate mortgage investment conduit computer 124; a trust computer 126; a limited liability company computer 128; a partnership computer 130; a corporation computer 132; a servicing computer 134; a reporting computer 136; a broker computer 138; a trading computer 140; a clearing computer 142; a rating agency computer 144; an investment banker computer 146; a mortgage banker computer 148; a user of funds computer 150; a supplier of funds computer 152; another computer 154; and a computer with control means 162.

As represented in FIG. 1A, each said computer can have a corresponding input means (156) such as a keyboard, a storage means (158) such as a disk drive, and an output means (160) such as a printer, modem, etc. 156, 158, and 160 can be viewed, in a sense, as plugging into any of the computers, as illustrated in FIG. 1A.

Any computer in the FIGS. 1 and 1A may include one or more input means (12, 156). Possible examples of said input means (12, 156) include, but are not limited to: a keyboard, a scanner, a voice recognition device, a connection with another computer and/or other digital device, etc. Any computer in the FIGS. 1 and 1A may, or may not, employ any input means (12, 156), either individually or in cooperation with another computer. Data may be input into one or more of the computers of FIGS. 1 and 1A using one or more input means (12, 156). The input into one or more of the computers of the FIGS. 1 and 1A may include one or more software programs, including, but not limited to: a software program stored on a disk, a software program stored on a memory card or stick, a software program stored on tape, a software program stored in a holographic storage device, a software program stored on a computer memory device, and/or a software program stored on another computer or other digital device.

Any computer in FIGS. 1 and 1A may include one or more storage means (10, 158). Possible examples of said storage means (10, 158) include, but are not limited to: a magnetic disk drive, an optical disk drive, a holographic disk drive, a tape drive, a memory card or stick, dynamic random access memory (dynamic RAM), static random access memory (static RAM), and/or another computer or other such device. Any computer in the FIGS. 1 and 1A may or may not employ more than one of any such storage means (10, 158).

Any computer in FIGS. 1 and 1A may include one or more output means (16, 160). Possible examples of said output means (16, 160) include, but are not limited to: a monitor, a printer, a voice synthesizer, a disk drive, a holographic disk drive, and a connection with another computer and/or other device. Any computer in FIGS. 1 and 1A may, or may not, employ any output means (16, 160), either individually or in cooperation with another computer. Data may be output from one or more of the computers in FIGS. 1 and 1A using one or more output means (16, 160). The output from one or more of the computers as in FIGS. 1 and 1A may include one or more software programs, including, but not limited to: a software program stored on a disk, a software program stored on a memory card or stick, a software program stored on tape, a software program stored on a holographic disc drive, and/or a software program transmitted to another computer or other device.

FIG. 1B illustrates an embodiment of a computer control means that includes a menu (180) and sub-menus (182, 184, 186, 188 and 190). The main menu (180) includes the functions of pricing, servicing, risk management, acquisition and selling. The sub-menu under pricing (182) includes the choices of: 1) given a real return, determining price; and, 2) given a price, determining a real return. The sub-menu (184) under servicing includes the choices of: 1) monitoring; 2) managing payments and accounting; and, 3) managing defaults. The sub-menu (186) under risk management includes the choices of: 1) assessing and managing real currency risk; 2) assessing and managing real interest rate risk; and, 3) assessing and managing default risk. The sub-menu (188) under acquisition includes the choices of: 1) originating the instruments; and, 2) purchasing the instruments. The sub-menu (190) under selling includes the choices of: 1) selling through an organized exchange; 2) selling through broker/dealers; and, 3) selling through investment bankers.

The FIGS. 2, 2A, 2B, 2C, 2D and 2E are flow charts for sample embodiments using fixed tiers. In each case (FIG. 2) the process begins 200 by specifying one or more constant dollar instruments in a fixed tier. The examples of embodiments involving the use of fixed tiers include: constant dollar leveraged lease funding 202; funding a constant dollar instrument by tranching cash flows 204; and securitizing a tier of constant dollar instruments contained in a fixed tier 206.

In the possible example of constant dollar leveraged lease financing, the first step is to specify the constant dollar operating lease comprising the one tier, including, but not limited to: the asset being leased; the lessee; the price of the asset; the (tax) depreciation schedule; the expected economic life of the asset; a real lease rate; a currency; an index; and a frequency of adjustment 208.

The asset being leasing may be an infrastructure asset such as a gas pipeline, a power plant, a railroad line, etc. An ability of constant dollar leveraged lease financing that may be advantageous in infrastructure finance is that the lessee can use constant dollar leveraged lease financing to unlock the value of capital-intensive infrastructure assets and continue to control the assets and profit from their use for as long as the lessee continues to make the fixed real lease payments.

The next step is to use market data, including a real interest rate, to specify the instruments comprising the other tier, including a nonrecourse constant dollar leveraging loan or loans and an equity investment by a lessor 210. The nonrecourse leveraging loan or loans may be in the same currency as the constant-dollar leveraged lease or in a different currency. There may be more than one nonrecourse constant dollar leveraging loan in one or more than one currency.

Then the system 1 determines whether the constant dollar lease payments are greater than the leveraging constant dollar loan payments 212. If the answer is no, the constant-dollar lease is repriced by changing the price of the asset and/or the real lease payments 214 and the system 1 returns to step 208. If the answer is yes, the system 1 (FIG. 2A) calculates the expected real, after-tax return to the lessor 216.

Next, the system 1 determines 218 whether or not the expected real return to the lessor is equal to the required real return. If the answer is no, the system 1 returns to step 214, repricing the constant dollar lease.

If the answer is yes, both tiers are placed into a bankruptcy-remote entity (a special purpose entity), the constant dollar instruments are converted into equivalent nominal instruments, and complete documentation of the funding is prepared by computer and outputted 220.

The final two steps are to close the funding 222 and service the instruments comprising each tier 224.

In the example of funding a constant dollar instrument by tranching cash flows 204, the first step (FIG. 2B) is to specify the constant dollar instrument that is to be tranched, which comprises the one tier, including the real cash flows, currency, index and frequency of adjustment 230.

The next step is to specify constant dollar instruments comprising an other tier, said constant dollar instruments having varying maturities, by associating the cash flows of the one tier with the other tier 232.

The system 1 then determines if the cash flows of the one tier are not less than the cash flows of the other tier 236. If the answer is no, the system 1 revises the specification of the constant dollar instruments comprising the other tier 238 by revisiting the step of associating the cash flows of the one tier with the other 232. If the answer is yes, the system 1 uses market data, including real interest rates for different maturities, to price each constant dollar instrument in the other tier and the constant dollar instrument comprising the one tier 240.

The system 1 then (FIG. 2C) then calculates the net total sales price of the constant dollar instruments that comprise the other tier and the purchase cost of the constant dollar instrument that comprises the one tier 242.

The next step is determine if the net total sales price is greater than the purchase cost 244. The purchase cost may include charges for time and resources expended by investment banker or other entity performing the funding.

If the answer is no, the tranching is not a cost effective and the funding does not proceed 246. If the answer is no, the system 1 proceeds to step 220.

In the example of securitizing constant dollar instruments contained in a fixed tier 206, the first step (FIG. 2D) is to specify constant dollar instruments that are to purchased or originated and will comprise the one tier, including the type or types of instruments, maturities, credit quality, amounts, cash flows, real interest rate, etc. 260.

The system 1 then aggregates the cash flows of the constant dollar instruments that comprise the one tier 262. The next step is to specify homogeneous constant dollar securities with differing claims priorities and maturities by splitting the aggregate cash flows of the one tier by claims priorities and maturities, and place these constant dollar securities in an other tier 264.

The next step is to use market data, including real interest rates for different maturities and risk classes, to price the constant dollar securities in the other tier and to determine the size and cash flows of the equity/high yield remainder piece in the other tier 266.

The system 1 then determines the expected real return and risk of the equity/high yield piece in the other tier 268. The next step is to determine whether the return on the equity/high yield piece is satisfactory relative to risk 270. If the answer is no, then the system 1 adjusts the real returns of the constant dollar instruments that are to be purchased or originated 272 and the system 1 returns to step 262. If the answer is yes, the system 1 converts the constant dollar instruments to equivalent nominal instruments 274. If desired, the value of the constant dollar instruments to be purchased or securitized may be hedged 276.

The final steps are to purchase or originate the constant dollar instruments to be securitized 278; place both tiers in a bankruptcy-remote entity (a special purpose entity) and output complete documentation of the funding 280; close the funding by selling securities that comprise the other (funding) tier 282; and service the instruments comprising each tier 284.

The FIGS. 3 and 3A are flow charts for a sample embodiment using ongoing tiers.

The first step (FIG. 3) is to specify a financial intermediary, such as a finance company, insurance company or depository institution that will associate the ongoing tiers to implement the funding 300.

The next step is to jointly specify: 1) the constant dollar instruments that are to be purchased and/or originated and contained in the one ongoing tier, including the types of instruments, credit quality and terms 302; and, 2) the constant dollar instrument that are to be issued and contained in the other tier, including the type of instruments and terms 304.

Then the system 1 determines the size of the equity capital piece to be contained in the other (funding) tier 306. Next, the system 1 uses market data, including real interest rates, to calculate the expected real return on the equity capital piece 308.

The next step is to determine if the expected real return on the equity piece is satisfactory 310. If the answer is no, modify the specifications of the constant dollar instruments contained in any of the tiers 312 and proceed to step 306. If the yes, the system 1 (FIG. 3A) converts the constant dollar instruments into equivalent nominal instruments and generates complete documentation of the funding 314. The financial intermediary then implements the funding by purchasing and/or originating the constant dollar instruments comprising the one tier and selling instruments comprising the other (funding) tier 316.

The system 1 services the instruments comprising each tier 318. Updated market data, including real interest rates 320 and the system 1 proceeds to step 308 creating an ongoing cycle.

We claim:

1. A computer-aided method comprising:
providing a computer system comprising a computer connected to an input device and to an output device; and
performing in the computer at least one computer program that facilitates:
receiving, at the input device, real-valued, inflation-immunized derivative terms and a stipulated index as a function of time;
receiving, at the input device, input values corresponding to the real-valued, inflation-immunized derivative terms, wherein the input values include at least a quantity value and data from the stipulated index at a corresponding time;
processing, by the computer, the real-oriented, inflation-immunized derivative terms with the stipulated index and thereby producing nominal-valued, non-inflation-immunized data corresponding to the real-valued, inflation-immunized derivative terms; and
outputting the nominal-valued, non-inflation-immunized data at the output device.

2. The computer-aided method according to claim 1, wherein the derivative terms correspond to financial instrument futures.

3. The computer-aided method according to claim 1, wherein the derivative terms correspond to one of currency futures and forward contracts.

4. The computer-aided method according to claim 1, wherein the derivative terms correspond to swaps.

5. The computer-aided method according to claim 1, wherein the derivative terms correspond to options including any one of puts and calls.

6. The computer-aided method according to claim 1, wherein the derivative terms correspond to forward contracts.

7. The computer-aided method according to claim 1, wherein the derivative terms correspond to soft contracts including perishable futures contracts.

8. The computer-aided method according to claim 1, wherein the derivative terms correspond to metal futures contracts.

9. The computer-aided method according to claim 1, wherein the derivative terms correspond to insurance contracts.

10. The computer-aided method according to claim 1, wherein the derivative terms correspond to any one of lease contracts, purchase contracts and rental contracts.

11. The computer-aided method according to claim 1, wherein the derivative terms correspond to judgments paid over time.

12. The computer-aided method according to claim 1, wherein the stipulated index comprises an infill index; and wherein said processing, by the computer, uses said infill index to processes, by the computer, the real-oriented, inflation-immunized derivative terms with the infill index to produce nominal-valued, non-inflation-immunized data corresponding to the real-valued, inflation-immunized derivative terms.

13. The computer-aided method according to claim 12, wherein the infill index indicates an agreed upon approach to interpolate data for days missing from the stipulated index.

* * * * *